(12) United States Patent
Benini

(10) Patent No.: US 10,272,617 B2
(45) Date of Patent: Apr. 30, 2019

(54) METHOD AND A MACHINE FOR MANUFACTURING CONTAINERS

(71) Applicant: SOCIETA' PER AZIONI CURTI-COSTRUZIONI MECCANICHE, Castel Bolognese (RA) (IT)

(72) Inventor: Nabore Benini, Riolo Terme (IT)

(73) Assignee: SOCIETA' PER AZIONI CURTI-COSTRUZONI MECCANICHE, Castel Bolognese (RA) (IT)

( * ) Notice: Subject to any disclaimer, the term of this patent is extended or adjusted under 35 U.S.C. 154(b) by 623 days.

(21) Appl. No.: 14/704,043

(22) Filed: May 5, 2015

(65) Prior Publication Data

US 2015/0321436 A1    Nov. 12, 2015

(30) Foreign Application Priority Data

May 6, 2014   (IT) .............................. RE2014A0045

(51) Int. Cl.
*B31B 50/26*    (2017.01)
*B31B 50/25*    (2017.01)
*B29C 65/00*    (2006.01)
*B65B 47/08*    (2006.01)
(Continued)

(52) U.S. Cl.
CPC .............. *B29C 66/49* (2013.01); *B29C 65/08* (2013.01); *B29C 65/088* (2013.01); *B29C 65/7882* (2013.01); *B29C 66/1122* (2013.01); *B29C 66/3452* (2013.01); *B29C 66/4322* (2013.01); *B29C 66/43123* (2013.01); *B29C 66/5344* (2013.01); *B29C 66/71* (2013.01); *B29C 66/73921* (2013.01); *B29C 66/81415* (2013.01); *B29C 66/81423* (2013.01); *B29C 66/81463* (2013.01); *B29C 66/8242* (2013.01); *B29C 66/8322* (2013.01); *B29C 66/83221* (2013.01); *B29C 66/849* (2013.01); *B29C 66/851* (2013.01); *B31B 50/25* (2017.08); *B31B 50/26* (2017.08); *B31B 50/28* (2017.08); *B31B 50/322* (2017.08); *B65B 3/025* (2013.01); *B65B 7/18* (2013.01); *B65B 47/08* (2013.01);
(Continued)

(58) Field of Classification Search
None
See application file for complete search history.

(56) References Cited

U.S. PATENT DOCUMENTS 3,313,220 A    4/1967 Durat
3,424,068 A    1/1969 Scully
(Continued)

FOREIGN PATENT DOCUMENTS

DE        619395 C       10/1935
DE       1679904 A1       3/1972
(Continued)

*Primary Examiner* — Hemant Desai
*Assistant Examiner* — Tanzim Imam
(74) *Attorney, Agent, or Firm* — Browdy and Neimark, PLLC

(57) ABSTRACT

A method and a machine for realizing containers, including at least steps of impressing a shape in relief on a sheet of deformable material, enveloping the sheet about itself and reciprocally joining lateral flaps thereof in order to form a tubular blank, and closing a bottom end of the tubular blank.

15 Claims, 27 Drawing Sheets

(51) Int. Cl.
*B65B 3/02* (2006.01)
*B65B 7/18* (2006.01)
*B31B 50/28* (2017.01)
*B31B 50/32* (2017.01)
*B29C 65/08* (2006.01)
*B29C 65/78* (2006.01)
*B31B 50/36* (2017.01)
*B31B 50/88* (2017.01)
*B31B 50/04* (2017.01)
*B29L 23/20* (2006.01)
*B31B 50/06* (2017.01)
*B31B 50/66* (2017.01)
*B31B 50/81* (2017.01)
*B31B 50/07* (2017.01)
*B31B 110/20* (2017.01)
*B31B 50/59* (2017.01)

(52) U.S. Cl.
CPC ..... *B29C 66/72328* (2013.01); *B29L 2023/20* (2013.01); *B31B 50/042* (2017.08); *B31B 50/06* (2017.08); *B31B 50/07* (2017.08); *B31B 50/252* (2017.08); *B31B 50/324* (2017.08); *B31B 50/36* (2017.08); *B31B 50/594* (2018.05); *B31B 50/66* (2017.08); *B31B 50/81* (2017.08); *B31B 50/88* (2017.08); *B31B 2110/20* (2017.08)

(56) References Cited

U.S. PATENT DOCUMENTS

| | | | | |
|---|---|---|---|---|
| 3,572,339 A * | 3/1971 | Voss et al. | ............. | A61F 13/26 206/438 |
| 3,947,017 A * | 3/1976 | Seragnoli | ............. | B65B 43/185 271/165 |
| 3,958,501 A * | 5/1976 | Richards | ............. | B31B 50/00 493/105 |
| 4,838,847 A * | 6/1989 | Kume | ............. | B65B 3/025 493/133 |
| 5,120,292 A * | 6/1992 | Ueda | ............. | B31B 50/00 493/124 |
| 5,762,595 A | 6/1998 | Santiago | | |
| 6,168,149 B1 * | 1/2001 | Boldrini | ............. | B65H 3/085 271/107 |
| 6,343,460 B1 * | 2/2002 | Fujikawa | ............. | B65B 3/025 493/184 |
| 6,601,841 B1 * | 8/2003 | Werner | ............. | B65H 29/18 271/146 |
| 6,723,196 B2 * | 4/2004 | Fioretti | ............. | B29C 31/002 156/218 |
| 7,025,201 B2 * | 4/2006 | Draghetti | ............. | B65D 85/1045 206/268 |
| 2009/0094945 A1 | 4/2009 | Nakagawa et al. | | |
| 2009/0237795 A1 | 9/2009 | Koivukunnas et al. | | |

FOREIGN PATENT DOCUMENTS

| | | | | |
|---|---|---|---|---|
| DE | 102007044827 A1 * | 5/2008 | ............. | G09B 21/02 |
| EP | 0281206 A2 | 9/1988 | | |
| EP | 0611699 A1 | 8/1994 | | |
| EP | 0999136 A1 | 5/2000 | | |
| EP | 1188542 A2 | 3/2002 | | |
| EP | 1451084 A1 | 9/2004 | | |
| FR | 2624053 A1 | 6/1989 | | |
| GB | 2092060 A | 8/1982 | | |
| WO | 2010/044024 A1 | 4/2010 | | |

* cited by examiner

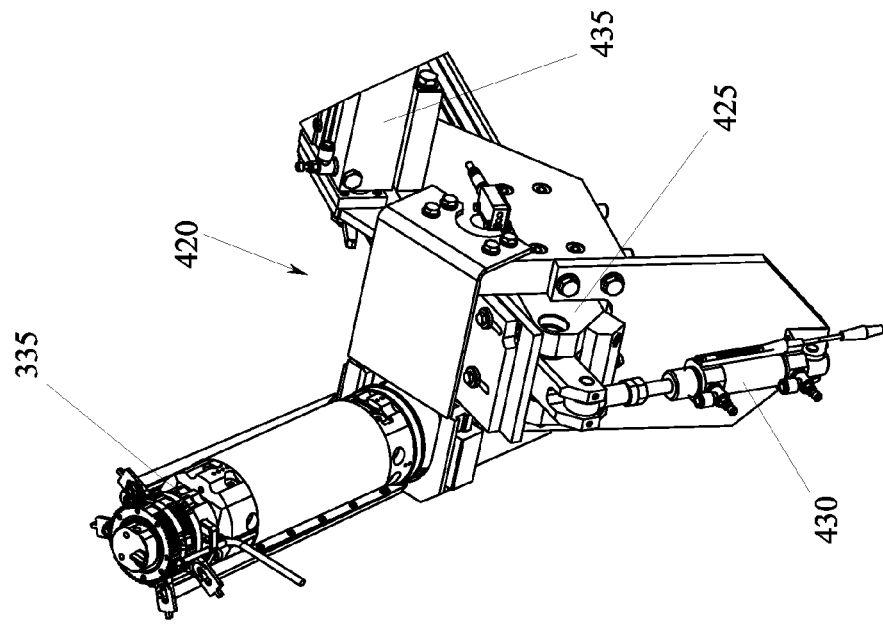
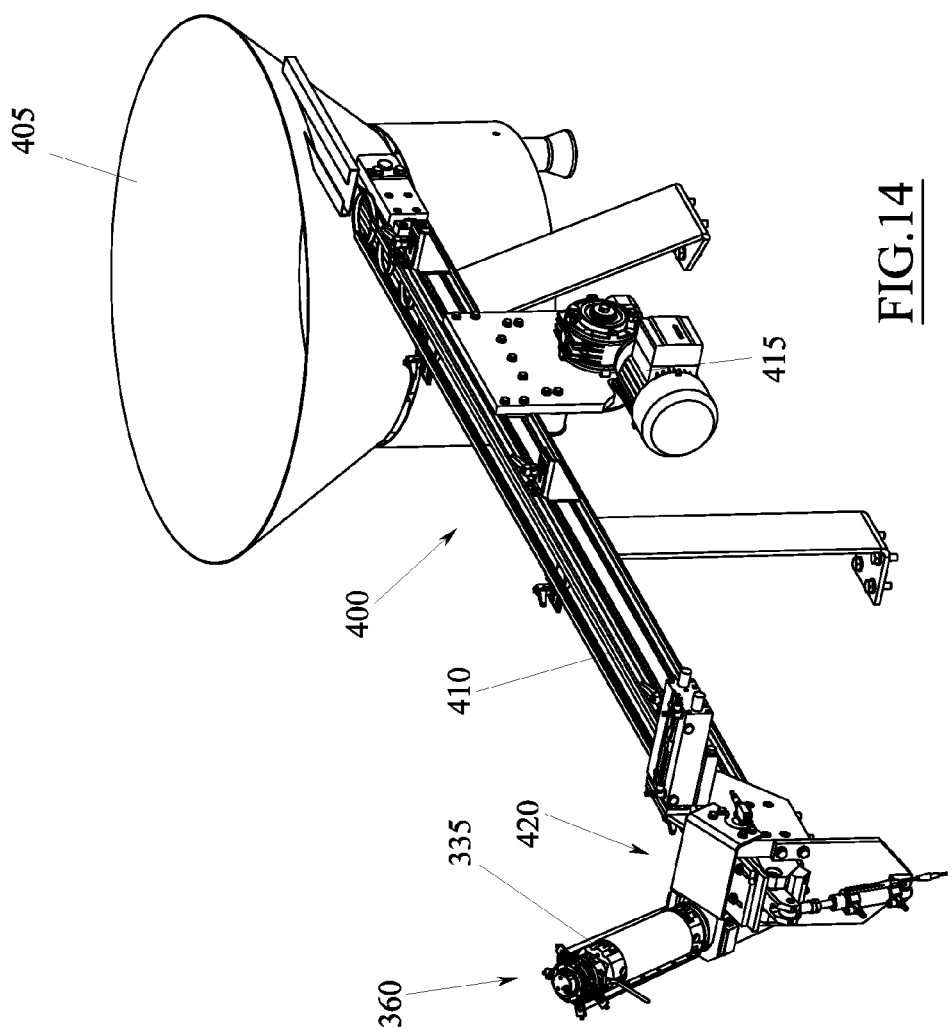
FIG.15
FIG.14

METHOD AND A MACHINE FOR MANUFACTURING CONTAINERS

TECHNICAL FIELD

The present invention relates in general to a method and a machine for realising containers starting from a deformable material, for example a composite material based on paper and polythene.

In particular, the invention is directed to a method and a machine for manufacturing containers for fluids, granulates, powders and the like, for example for beverages and solid or semi-fluid foods.

PRIOR ART

In this field, devices are known which are able to realise, starting from one or more blanks of composite material, a container with flat sides, for example a parallelepiped or tetrahedral shape, particularly widely used for packing non-carbonated beverages.

The main drawback of these devices consists in the fact that they do not enable significantly modifying the shape of the containers, which are therefore all very similar and standardized.

To obviate these drawbacks, the Applicant has in the past disclosed a technology which enables realising containers having various and generally cylindrical shape. This technology is described for example in European patent EP 1188542.

The technology in question generally includes forming the container starting from a strip of composite material in a reel. The strip of composite material is first unwound from the reel, cut and wound on a support core, such as to realize a tubular blank. Using appropriate movement means, the support core is then transported and halted in a succession of work stations, among which in order a sealing station, a shaping station and a release station. In the sealing station, an end of the tubular blank is closed in such a way as to define the closed bottom of the container. In the shaping station, the cylindrical lateral wall of the tubular shape is deformed by means of blow moulding. Lastly, in the release station, the shaped container is removed from the support core and distanced from the machine.

In particular, deformation by blow moulding of the container, also known as macroshaping, is obtained by closing the container internally of a profiled cavity, created by closing two half-dies and forcing the lateral walls of the container against the walls of the profiled cavity, by means of insufflating pressurized gas therein.

This process effectively enables sinuously modifying the overall external shape of the container, giving it for example a convex shape or a more or less corrugated shape, but does not enable realizing thereon a defined and marked decoration, which can also reproduce a graphic motif such as a design or a decoration.

SUMMARY OF THE INVENTION

An aim of the present invention is therefore to remedy this drawback, by disclosing a method and a machine which enable realising defined and marked decorations.

A further aim is to disclose a method and a machine which enable obtaining an increase in productivity with respect to the machines and methods of the prior art.

A further aim is to attain the above-mentioned aims with a solution that is simple, rational and relatively inexpensive, compatibly with the requested specifications. These and other aims are attained by the characteristics of the invention reported in the independent claims. The dependent claims delineate preferred and/or particularly advantageous aspects of the invention.

In greater detail, an embodiment of the invention relates to a method for realising containers, comprising at least steps of:
impressing a shape in relief on a sheet of deformable material,
    enveloping the sheet about itself and reciprocally joining lateral flaps thereof in order to form a tubular blank, and
    closing a bottom end of the tubular blank.

Together with the step of impressing the sheet, also known as micro-shaping, it is advantageously possible to realise a profile in relief that is very definite and marked, which therefore can reproduce the shape of even rather complex graphic motifs, such as decorations or designs which, in the following steps of enveloping and closure of the bottom will remain clearly visible on the external surface of the finished container.

In an aspect of the invention, the deformable material of the sheet can be a composite material containing paper and polythene. This material can for example be obtained by lamination. Also, and preferably, the material can have a maximum stretching capacity prior to breakage in a laminating direction comprised between 15% and 25%, and a maximum stretching capacity in transversal direction to the laminating direction comprised between 10% and 20%.

These characteristics have the advantage of giving the material a high degree of malleability which improves the performance of the micro-shaping step, and facilitates also the following enveloping and closing steps of the bottom of the tubular blank.

In a further aspect of the invention, the method can comprise a step of obtaining the sheet by cutting a strip of the deformable material.

In this way the method can be carried out substantially continuously without halting production.

In a further aspect of the invention, the method can comprise a step of heating the sheet, before carrying out the step of impressing the shape in relief.

This step has the effect of increasing the malleability of the material and making the following impression step more effective.

In an aspect of the invention, the step of impressing the profile in relief can include compressing the sheet between two half-dies, at least one of which bears the shape to be impressed in relief.

This aspect of the invention provides a simple and effective solution for carrying out the impression step.

In a further aspect of the invention, following the enveloping step, the lateral flaps of the sheet can be reciprocally joined by ultrasound welding.

This method is advantageous due to the heat-weldability of the material used and advantageously enables fixing the tubular blank without the aid of glues or other more complex methods. In other embodiments, however, the join between the two lateral flaps of the sheet can be carried out using other systems, for example by means of heat-welding carried out using traditional heating elements or with the use of glue.

In a further aspect of the invention, the method can comprise further steps of:
    predisposing a reinforcing ring coaxially at an end of the tubular blank opposite the bottom end, joining the reinforcing ring to the tubular blank.

In this way a stiffening of the open edge of the container is obtained, which can be useful both during the following steps of manufacturing and for defining a seating for any eventual closing lids.

In an aspect of the invention, the reinforcing ring can be joined to the tubular blank by ultrasound welding.

In this case too, the join between the tubular blank and the reinforcing ring can be carried out using other systems, for example by heat-welding using traditional heating elements or with the use of glue.

In a further aspect of the invention, the method might include a step of folding over the end of the tubular blank opposite the bottom end so as to realise an annular edging.

In this aspect of the invention, the mouth of the container is stiffened, without any need to use the reinforcing ring.

In a further aspect of the invention, the closing operation of the bottom end of the tubular blank comprises steps of:
flattening the bottom end by bringing two portions thereof into reciprocal contact,
reciprocally joining the portions to form a rib,
folding the opposite ends of the rib below and towards an inside of the tubular blank.

In this way, the tubular blank is closed on itself without any need for predisposing separate elements which would pointlessly complicate both the container and the manufacture thereof.

In an aspect of the invention, the portions of the bottom end of the tubular blank are joined by ultrasound welding.

In this case too, it is possible for the join between the portions of the bottom end to be carried out using other systems, for example by heat-welding carried out using traditional heating elements or by the use of glue.

In a further aspect of the invention, the profile impressed in relief on the sheet (during the micro-shaping step) can comprise predetermined crease lines for the ends of the rib. With this solution, the step of folding the bottom of the container can be facilitated without adding further work steps.

In a further aspect of the invention, the method can also comprise a step of profiling the lateral wall of the tubular blank by means of blow moulding.

This aspect of the invention enables profiling the container not only using the micro-shaping method but also using the macro-shaping method, realising a synergic effect and thus increasing the possibility of differentiating the shape of the container.

For this purpose, the step of profiling the lateral wall by blow-moulding can comprise steps of:
closing the tubular blank internally of a profiled cavity,
forcing the lateral walls of the tubular blank against the walls of the profiled cavity by means of introduction of a pressurized gas internally of the tubular blank.

This solution enables particularly effectively and reliably obtaining a macro-shaping effect.

In a further aspect of the invention, the method can comprise a further step of deforming the closed bottom of the tubular blank so as to realise a recess.

The realising of this recess has the effect of defining a projecting perimeter edge on the bottom of the container, which offers a much stabler and safer rest with respect to a uniformly flat bottom which, by effect of the internal pressures due to the products packed in the container, might take on a very unstable convex shape.

In an aspect of the invention, the recess can be obtained by pressing a punch against the closed bottom of the tubular blank.

This aspect of the invention provides a very simple and effective solution for realising the recess.

A further embodiment of the present invention relates to a machine for realising containers according to the above-described method, which generally comprises:
a first apparatus for impressing a shape in relief on a sheet of deformable material,
a second apparatus able to envelop the sheet on itself and reciprocally join lateral flaps thereof in order to form a tubular blank, and
a third apparatus able to close a bottom end of the tubular blank.

This embodiment of the invention substantially has the same effects as the method delineated in the foregoing, in particular the advantage of enabling manufacturing of very defined and marked relief shapes, which can thus reproduce graphic motifs that are even quite complicated and varied.

In an aspect of the invention, the machine can further comprise:
a store defining a housing able to contain a ream of sheets, and
transfer means for transferring a sheet at a time to the first apparatus.

This detail enables supplying the sheets to the machine continuously up to the eventual emptying of the store which functions as a feeder store.

In a further aspect of the invention, the transfer means can comprise:
an oscillating element,
gripping means of the sheet located on the oscillating element, and
actuator means able to cyclically oscillate the oscillating element about a horizontal axis between a raised sheet-collecting position and a lowered sheet-releasing position to the first apparatus.

This aspect provides a particularly simple and reliable solution for transfer of the sheets from the store to the first production apparatus.

In a further aspect of the invention, the machine might however comprise:
means for unwinding a strip of deformable material from a reel, and
cutting means able to sub-divide the strip into sheets.

In this way, the machine would not require a manual loading of the sheets into the store, such that the functioning thereof might occur continuously for long periods even without the supervision of operators.

In an aspect of the invention, the first apparatus can comprise transport means able to advance the sheet through a plurality of work stations, which comprise at least a sheet-receiving station, a profiling station provided with impressing means able to impress the profile in relief on the sheet, and a transfer station of the sheet from the first to the second apparatus.

This aspect of the invention provides a valid solution for automation of the process of impressing the sheet.

In a further aspect of the invention, the work stations of the first apparatus can also comprise an auxiliary station located between the receiving station and the profiling station, which is provided with one or more operating means selected from a group constituted by:
heating means of the sheet,
ink-jet printing means,
labelling means,
code-reading optical means.

On the basis of the choice of means to predispose in the auxiliary station, this aspect of the invention offers the possibility of subjecting the sheet to some further operations which can serve for the decoration, for example the ink-printing, and for facilitating the steps following the manufacturing process, such as for example the heating of the sheet, and also for managing other processes, such as for example the reading of the bar codes.

In an aspect of the invention, the transport means of the first apparatus can comprise a conveyor belt.

This aspect provides a rather simple and reliable solution for advancing the sheets through the various work stations of the first apparatus, without interfering with the devices present.

In a further aspect of the invention, the conveyor belt can be retractable at the transfer station.

This aspect facilitates the transfer and the release of the sheets to the second work station.

In an aspect of the invention, the impressing means can comprise a press provided with actuator means able to press two half-dies one on another, at least one of the half-dies bearing in relief the profile to be pressed on the sheet.

This aspect of the invention provides a simple and effective solution for carrying out the impression step.

An aspect of the invention further includes the actuator means comprising pneumatic and/or mechanical actuators.

This solution has the effect of guaranteeing the exertion of the thrust necessary for realising the relief profile on sheets of any thickness, at least among those suitable for the process.

In a further aspect of the invention, the transfer station of the first apparatus can comprise guide means, which are able to cooperate with the transport means for giving the sheet an arched shape.

This detail has the effect of facilitating and improving the transfer of the sheets towards the second apparatus.

In a further aspect of the invention, the second apparatus can comprise:
- a plurality of support cores, each of which is provided with enveloping means for winding a sheet about itself, and
- movement means of the support cores through a plurality of work stations, which comprise at least a receiving station of the sheet from the first apparatus, a fixing station provided with means able to reciprocally join the lateral flaps of the sheet enveloped on the support core, and a transfer station of the sheet to the third apparatus.

This aspect of the invention provides an effective and reliable solution for automation of the forming process of the blank.

In an aspect of the invention, the enveloping means of each support core can comprise:
- a retaining element able to move in a transversal direction with respect to the axis of the support core, such as to clamp a sheet against the lateral surface of the support core,
- a pair of enveloping elements positioned on opposite sides of the retaining element and able to rotate about the axis of the support core in opposite directions, for winding the sheet about the relative support core.

With this solution, the sheet is wound to form the tubular blank in a particularly reliable way.

In an aspect of the invention, the enveloping means can further comprise a pair of curtain arms, each of which has an edge constrained to the retaining element and an opposite edge constrained to a respective enveloping element.

The arms have the advantage of more effectively retaining the sheet enveloped about the support core.

In a further aspect of the invention, the means for joining the lateral flaps of the sheet can comprise ultrasound welding means.

This solution is aided by the heat-weldability of the material used and advantageously enables fixing the tubular blank without the aid of glues or other more complex methods.

In a further aspect of the invention, the work stations of the second apparatus can further comprise an equipping station located upstream of the receiving station, which is provided with means for inserting a reinforcing ring at an end of the support core, and at least a second statin, i.e. a fixing station, located downstream of the receiving station, which is provided with means for joining the reinforcing ring to the tubular blank enveloped about the support core.

This aspect has the effect of providing a valid solution for automating the step of application of the reinforcing ring at the open edge of the container.

In an aspect of the invention, the joining means of the reinforcing ring to the tubular blank can comprise ultrasound welding means.

In a different aspect of the invention, the work stations of the second apparatus comprise an edging station located downstream of the fixing station, which is provided with means for joining the end of the tubular blank opposite the bottom end, realising an annular edge.

In this way, the mouth of the container can be effectively stiffened, without any need to use a reinforcing ring, and therefore without the need to equip the machine of the above-mentioned equipping station.

In a further aspect of the invention, the movement means of the second apparatus can comprise a rotor able to rotate about a horizontal axis, about which the support cores are arranged radially and angularly equidistantly.

This solution enables an efficient and effective movement of the cores between the various work stations.

In a further aspect of the invention, the machine can comprise transfer means, operating at the release station of the second apparatus, which are able to remove the tubular blank from the support core and transfer it to the third apparatus.

This specification has the effect of enabling an automatic passage of the tubular blanks from the second to the third apparatus.

An aspect of the invention in particular includes the transfer means comprising a pair of motorised belts.

This solution enables carrying out the transfer in a way that is rather safe and reliable.

In a further aspect of the invention, the third apparatus can comprise:
- a plurality of support cores,
- movement means of the support cores through a plurality of work stations, which comprise at least a receiving station of the tubular blank from the second apparatus, a sealing station comprising means for flattening a bottom end of the tubular blank by bringing two portions into reciprocal contact and joining the two portions to one another, forming a rib, and a release station of the tubular blank from the support core, and
- folding means arranged between the sealing station and the release station, which are able to cooperate with the movement of the support core between the stations, for folding the opposite ends of the rib below and towards an inside of the tubular blank.

This aspect of the invention provides an effective and reliable solution for the automation of the closing process of the bottom of the tubular blank.

In an aspect of the invention, the means for flattening and joining can comprise ultrasound welding means.

In a further aspect of the invention, the folding means can comprise:
a roller able to axially press the closed bottom end of the tubular blank, and
a pair of guides developing downstream of the roller and able to fold the ends of the rib.

This aspect provides a valid solution for efficiently and reliably carrying out the folding of the bottom.

In a further aspect of the invention, the third apparatus can comprise means for heating the tubular blank.

With the heating of the tubular blank, the material can be made more malleable and therefore more easily foldable.

In a further aspect of the invention, the work stations of the third apparatus can comprise a profiling station, positioned downstream of the folding means.

The folding station can comprise pressing means able to deform the closed bottom end of the tubular blank so as to realise a recess.

This aspect of the invention provides an effective and reliable solution for automating the manufacturing process of the projecting perimeter edge on the bottom of the container.

In a particular aspect of the invention, the pressing means can comprise a profiled punch and actuating means able to press the punch axially against the closed end of the bottom of the tubular blank.

This solution enables realising the recess simply and rapidly.

In an aspect of the invention, the profiling station of the third apparatus can comprise profiling means (in addition or alternatively to the pressing means) for shaping the lateral wall of the tubular blank by blow moulding.

This aspect of the invention enables profiling the container not only using the micro-shaping method but also the macro-shaping method, thus realising a synergic effect that increases the possibility of differentiating the shape of the container.

In an aspect of the invention, the profiling means can comprise two half-dies which can be reciprocally neared such as to define a profiled cavity which encloses the tubular blank, and means suitable for introducing gas internally of the tubular blank.

This aspect of the invention relates to an effective solution for automating the macro-shaping operation.

In an aspect of the invention, each support core of the third apparatus can comprise a perforated lateral wall.

This solution enables blowing pressurised gas internally of the tubular blank, both during the eventual macro-shaping operation and eventually for removing the finished container from the support core.

In a further aspect of the invention, each support core of the third apparatus can be provided with a pair of profiled plates reciprocally facing and projecting axially from the respect support core, and actuating means for opening the plates in a radial direction with respect to the axis of the support core.

These plates have the function of adding both the folding means in the closing of the bottom of the container, and the pressing means during the step of realising the recess on the bottom.

A further aspect of the invention includes each support core of the third apparatus being provided with an expansible clamp insertable in the tubular blank and the actuating means able to widen the clamp against the walls of the tubular blank.

The clamp guarantees the stability of the tubular blank during all the work steps carried out in the third apparatus.

In a further aspect of the invention, the movement means of the third apparatus can also comprise a rotor able to rotate about a horizontal axis, about which the support cores are arranged radially and angularly equidistant.

This solution enables efficient and effective movement of the cores between the various work stations.

Further characteristics and advantages of the invention will emerge from a reading of the description that follows, provided by way of non-limiting example, with the aid of the figures of the accompanying tables.

BRIEF DESCRIPTION OF THE DRAWINGS

FIG. 14 is a perspective view of a loading group of reinforcing rings, operating at an auxiliary station of the second work apparatus of the machine.

FIG. 15 is a detail in larger scale of FIG. 14.

DETAILED DESCRIPTION

Figure 1:
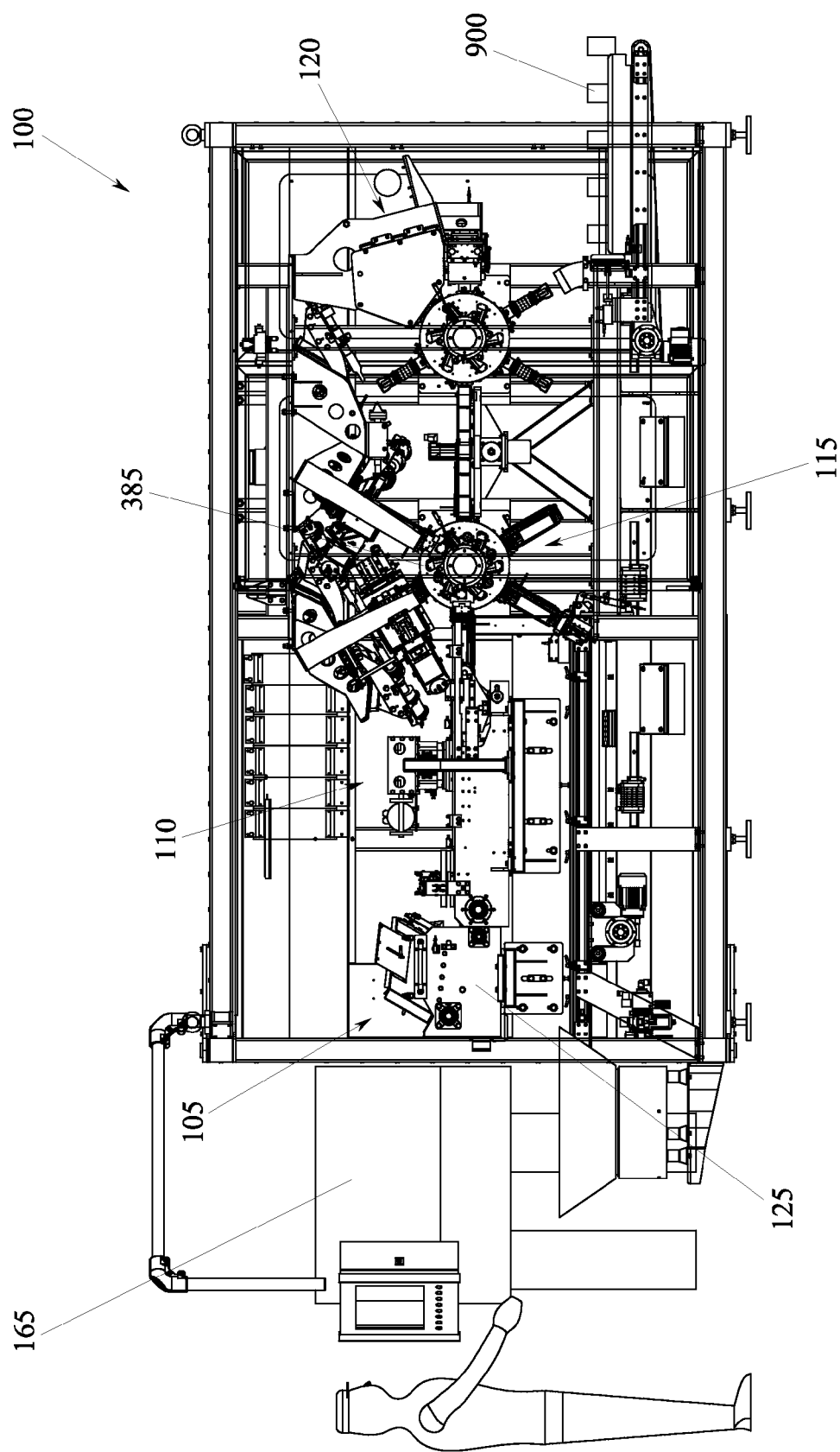
FIG. 1 is a lateral view of a machine according to an embodiment of the present invention in its entirety.

FIG. 1 illustrates a machine 100 for manufacturing containers 900 starting from sheets of deformable material.

The deformable material of the sheets can generally be a composite material containing water and polythene. In particular, the deformable material of the sheet can be a laminate, i.e. it can be a sheet obtained by pressing by lamination one or more layers of paper impregnated with polythene. The main characteristic of this laminate is that it has a very high break resistance. In the specific case, the laminate that is used by the machine 100 can have a stretch limit in the laminating direction comprised between 15% and 25%, preferably 20%, and a maximum stretch limit in the transversal direction to the lamination direction comprised between 10% and 20%, preferably 15%. The percentages are referred to the initial length of the laminate.

Figure 2:
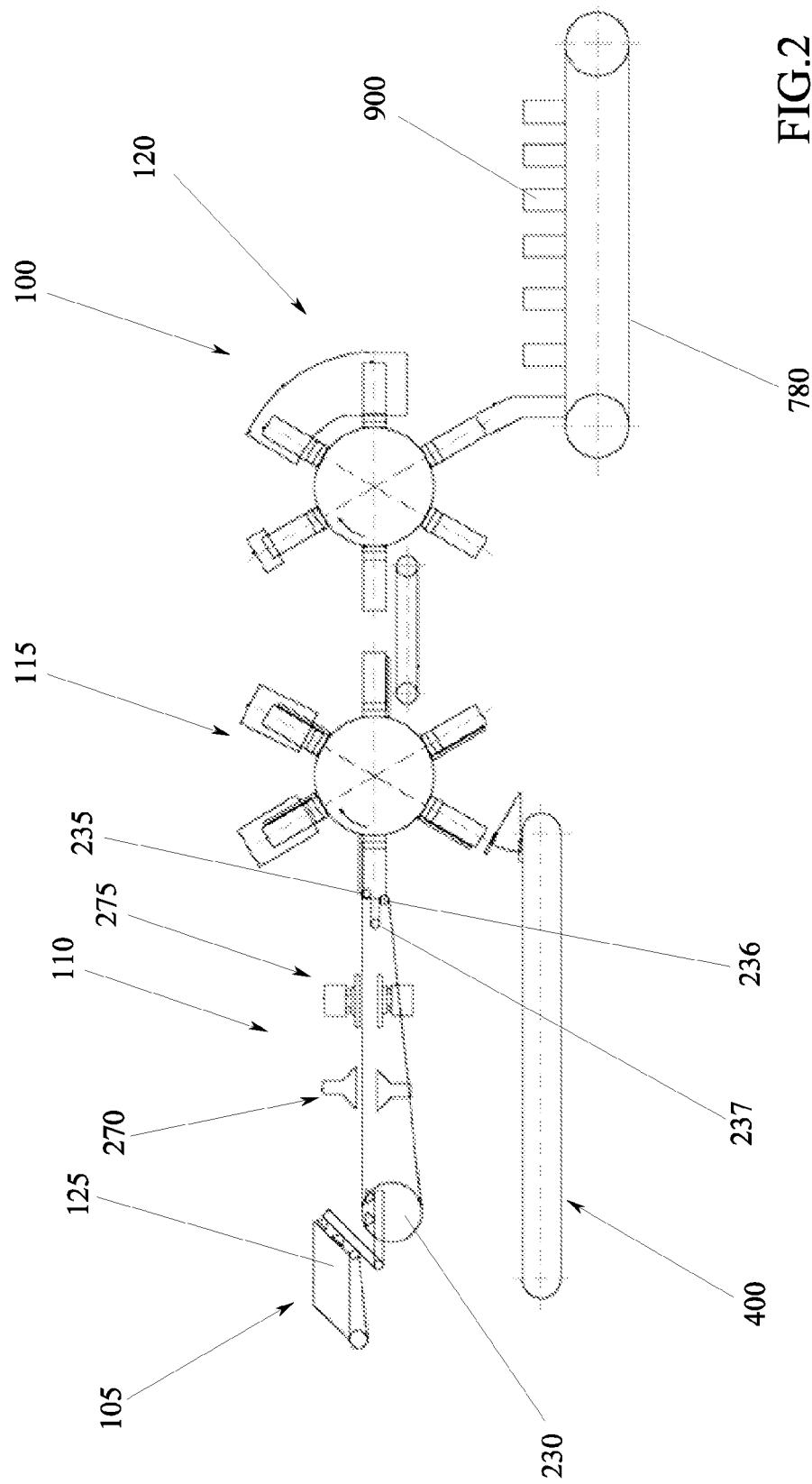
FIG. 2 is a diagram of the machine of FIG. 1.

As illustrated in the diagram of FIG. 2, the machine 100 substantially comprises four macro-systems, of which a supply apparatus 105 able to provide a sheet at a time, a first work apparatus 110 able to impress on the sheet a profile in relief, second work apparatus 115 able to envelop the sheet on itself and reciprocally join the lateral flaps thereof so as to form a tubular blank, and a third work apparatus 120 able to close a bottom end of the tubular blank forming the container 900, which will therefore have substantially a beaker-shape.

Figure 3:
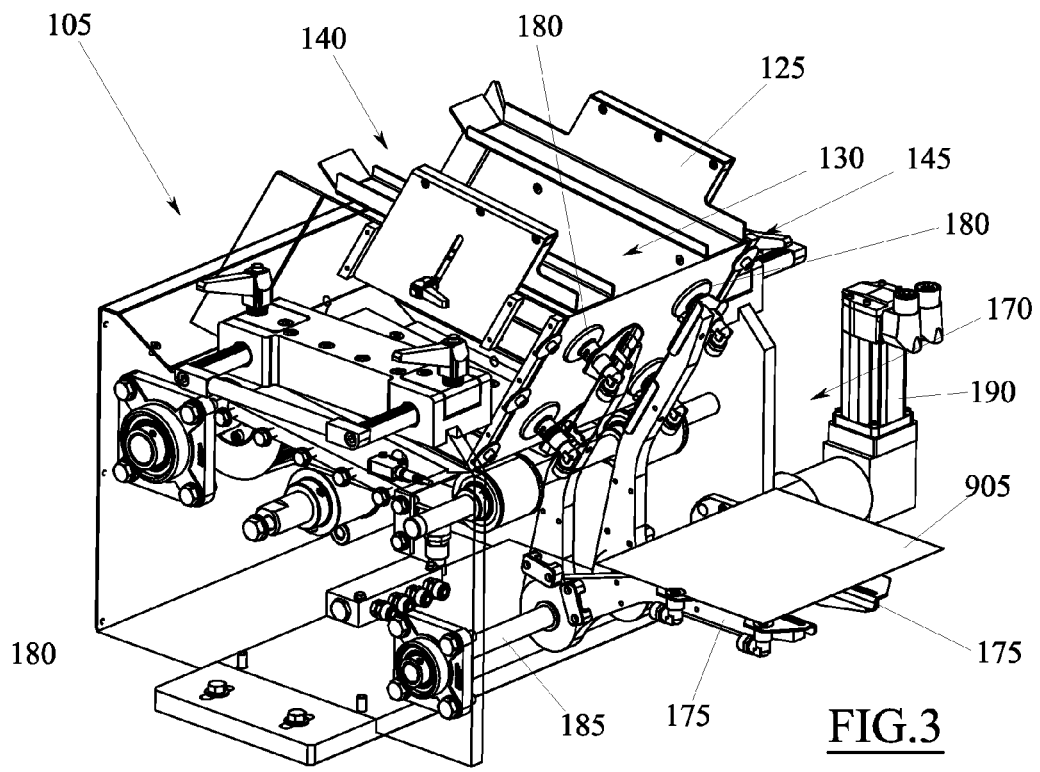
FIGS. 3 and 4 are two perspective views from different angles of a machine for supplying sheets belonging to the machine of FIG. 1.
Figure 4:
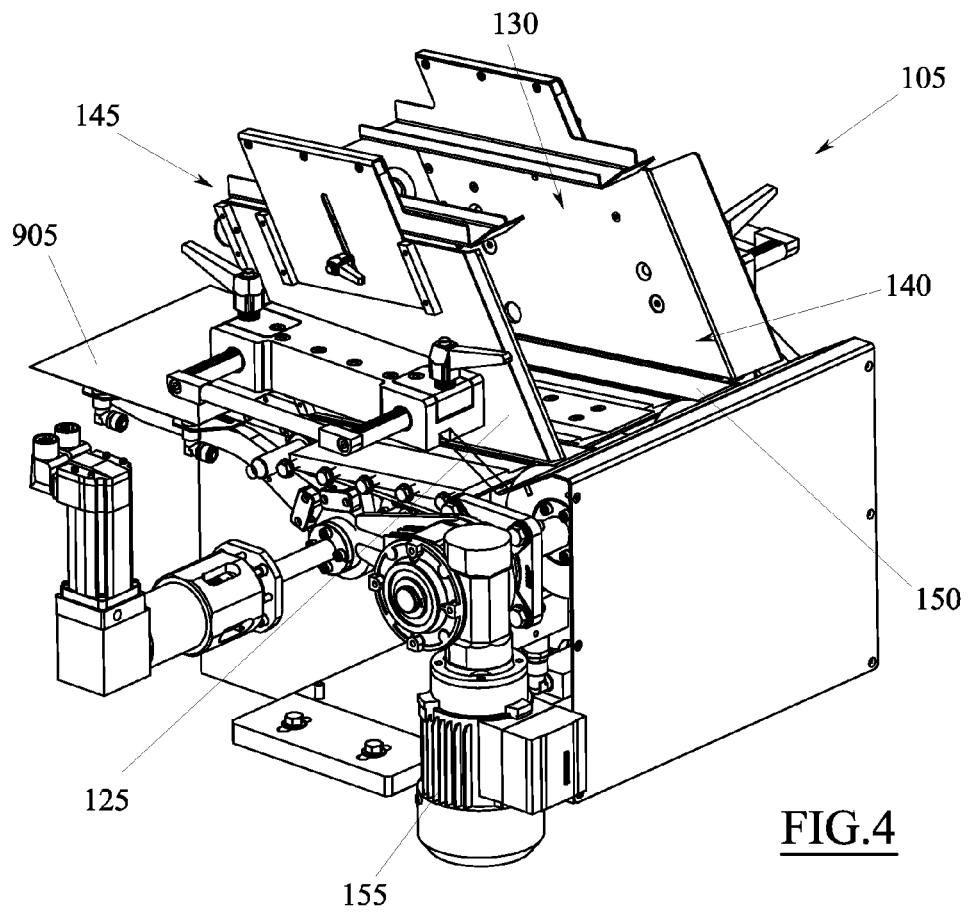

As illustrated in FIGS. 3 and 4, the supply apparatus 105 comprises a store 125 defining a housing 130 substantially horizontal and able to contain a ream of sheets (of which only one is visible and denoted by 905). The sheets are arranged internally of the housing 130 orientated vertically or slightly inclined from the bottom upwards by about 30°. The lower plane of the housing 130 is defined by a motorized transporter, which is able to advance the sheets of the ream from an inlet end 140 towards an outlet end 145 of the housing 130. In the illustrated example, the motorized transporter comprises a pair of sliding belts 150, which are simultaneously activated by an asynchronous gear reducer, to which they are connected via appropriate transmission organs. The housing 130 can be delimited laterally by sheet metal walls, the reciprocal distance of which can be regulated, on the basis of the dimensions of the sheets, by means of manual regulating systems which can be provided with graduated notches so as to facilitate the operation.

The ream of sheets can be loaded in the store 125 manually. A photocell can thus be predisposed to detect a minimum quantity of sheets in the housing 130, so as to be able to signal to the operators a need to load fresh sheets within a predetermined maximum time, for example about three minutes, after which the machine 100 automatically switches to emergency mode and halts.

Alternatively, the store 125 can be loaded automatically via a loading group 165 (see FIG. 1), which can generally be equipped with means for unwinding a strip of the deformable material from a reel, with cutting means able to sub-divide the strip into sheets, and with means for transferring the sheets to the store 125. In this way, the machine 100 can be made to function continuously, substantially without supervision by the operators, if not during the change-reel operations.

The supply apparatus 105 further comprises transfer means 170, which are able to transfer a sheet at a time from the outlet end 145 of the housing 130 to the first work apparatus 110. In general terms, the transfer means can comprise an oscillating element, which bears gripping means of the sheet 905, and actuator means for cyclically oscillating the oscillating element about a horizontal axis between a raised position for gripping the sheet and a lowered position for release of the sheet to the first apparatus 110. In the example illustrated in FIG. 3, the oscillating element is defined by a pair of profiled arms 175 which bear a plurality of pneumatic suckers 180, which are connected to a pneumatic aspirating plant (not illustrated). The profiled arms 175 are keyed to a same support shaft 185 having a horizontal axis, which is connected to an electric actuating motor 190, for example a brushless motor. When the profiled arms 175 are in the raised position, the suckers 180 are placed in contact with the sheet 905 which is at the outlet end 145 of the store 125, inclined as mentioned by about 30° with respect to the vertical. In this position, the aspirating plant is actuated, so that the suckers 180 adhere and retain the sheet 905. With the successive displacement towards the lowered position, the profiled arms 175 transport the sheet 905 up to positioning it on a horizontal lie plane. Once it has reached the lowered position, the aspirating plant is deactivated, so that the suckers 180 release the sheet 905 to the first work apparatus 110. It is specified that in FIG. 3, the profiled arms 175 are visible in both the raised and lowered positions, but that naturally they can reach these positions only in alternating mode.

As illustrated in FIG. 4, the first work apparatus 110 schematically comprises transport means 195, which advance the sheet (in arrival from the supply apparatus), maintaining it horizontal and at a constant step, for example every one or two seconds, and causing it to pause in a plurality of work stations, which comprise in order a receiving station 200 of the sheet, an auxiliary station 205 (optional), a profiling station 210 and a transfer station 215 in which the sheet is transferred from the first to the second work apparatus 115.

In the illustrated example, the transport means 195 comprise a pair of belts 220, parallel and reciprocally distanced, which define a horizontal and sliding rest plate. The belts 220 can be provided with bearers 225, i.e. elements positioned in succession along the development of the belt, which are raised with respect to the rest plane so as to make the advancement of the sheets stabler and more precise. Each belt 220 is closed and loop-wound on a drive pulley 230, positioned at the receiving station 200, and on three relay pulleys positioned at the transfer station 215, of which an upper pulley 235, a lower pulley 236 and an intermediate pulley 237 (see also FIG. 2), where the intermediate pulley 237 is closer to the drive pulley 230 with respect to the other two. The two drive pulleys 230 are both keyed on a same horizontal shaft 240, which is activated in rotation by an electric gear reducer 245, for example a brushless gear reducer, by means of suitable transmission means. The two pulley groups, respectively associated to each belt 220, are supported by two opposite lateral flanks 250, which are associated to slotted supports 255 which enable regulating the reciprocal distance thereof, and therefore the distance between the belts 220, on the basis of the dimensions of the sheets to be treated. This regulation is made possible also due to the fact that the horizontal shaft 240 is grooved, so as to enable the reciprocal displacement of the drive pulleys 230 in an axial direction.

As explained in the foregoing, each sheet 905 is released in the receiving station 200 by the transfer means 170 of the supply apparatus 105. In this way, the sheet goes to rest on the two belts 220 provided with the bearers 225 which guide the movement. The receiving station 200 can be further provided with two pneumatic cylinders 260 able to move a respective flat terminal 265 which compresses the sheet on a respective belt 220 for guaranteeing a correct thrust.

The sheets, moved by the belts 220, then passes to the auxiliary station 205, possibly passing above a photocell (not shown) which provides confirmation of the correct collection of the paper from the store 125. The auxiliary station 205 can be provided with one or more optional work means, generally denoted by 270 in FIG. 2, which can be selected from a group constituted by: heating means for heating the sheet, ink-printing means able to print a graphic sign on the sheet, labelling means for applying a label on the sheet, and optical means for reading codes, for example bar codes, previously applied on the sheet.

Figure 8:
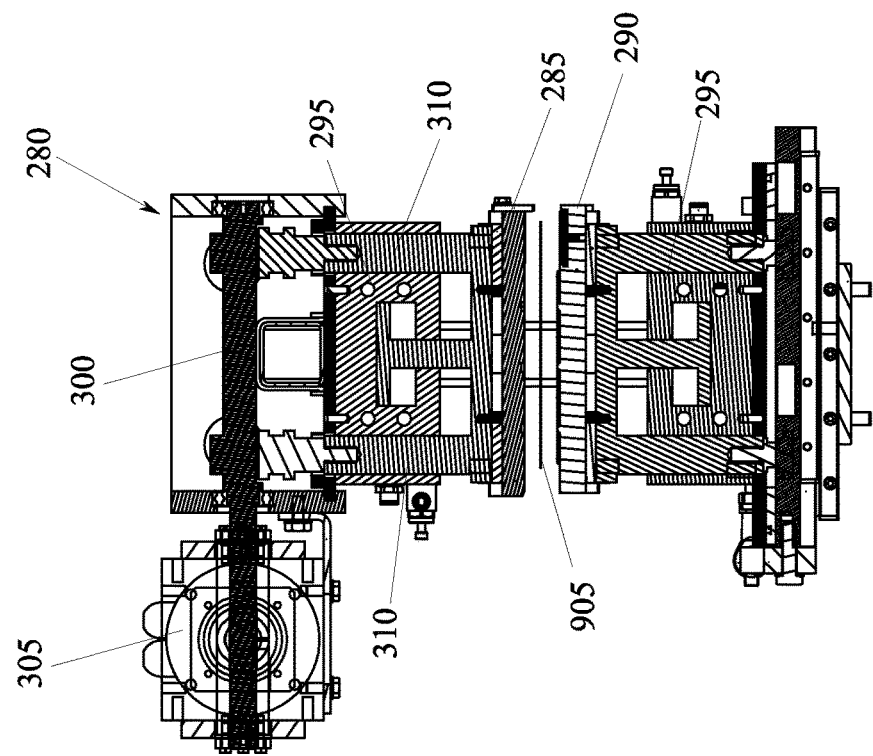
FIG. 8 is a section of the press of FIG. 7.
Figure 7:
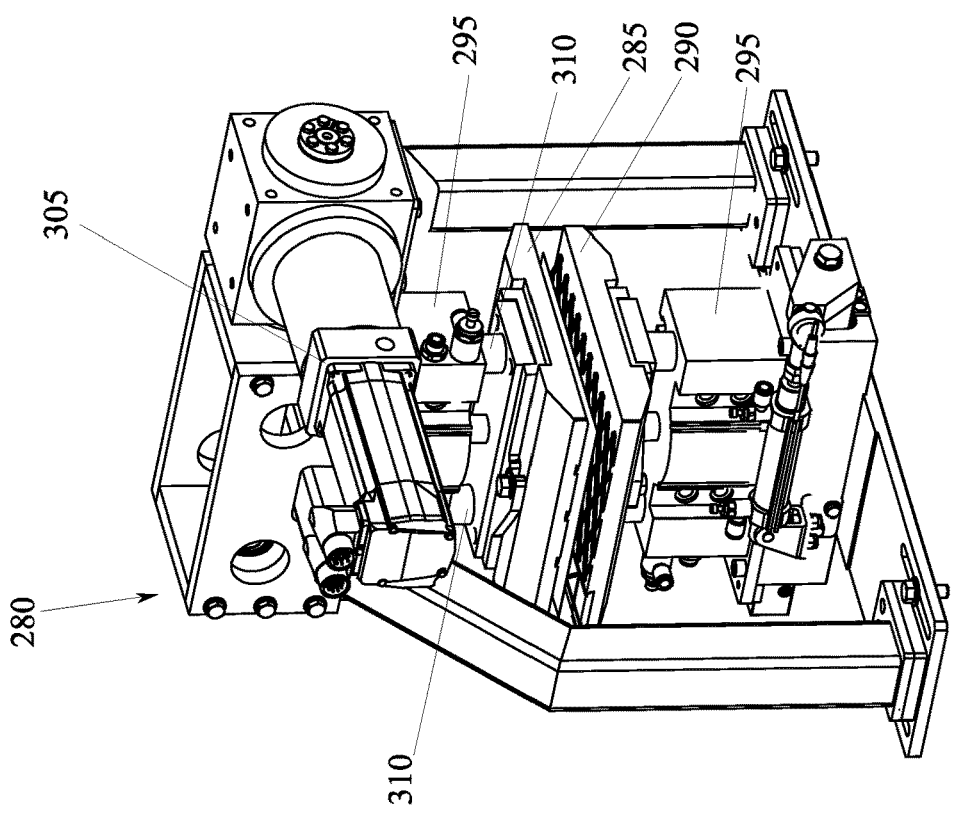
FIG. 7 is a perspective view of a press belonging to the first work apparatus of the machine of FIG. 1.

The following profiling station 210 is generally provided with impression means (denoted by 275 in FIG. 2) able to impress on the sheet a shape in relief, which will stand out in a well-defined way with respect to the sheet. The shape can be in high-relief or low-relief, preferably with a height of the relief of not greater than 2 mm, and can correspond to any graphic motif, comprising a simple trace, a grid, a profile or a design. The shape can also comprise facilitated crease lines, which ease the closing of the bottom of the container as will be described in the following. As illustrated in FIGS. 7 and 8, the impressing means 275 generally comprise a press 280 provided with an upper half-die 285 and a lower half-die 290, which are positioned respective above and below the rest plane defined by the belts 220, and at least one of which bears, in relief, the shape to be impressed on the sheet 905. The two half-dies 285 and 290, can both be made of a metal material, for example aluminium or steel, or one of them (the one not bearing the profile) can be made as a rubber plane. The two half-dies 285 and 290 are managed "by format", i.e. they can be rapidly replaced while maintaining the correct position and phase. Thus it is possible to replace the half-dies 285 and 290 according to the selected shape and as a function of the dimensions of the sheet.

The press 280 is further provided with pneumatic and/or mechanical means for reciprocally nearing and distancing the two half-dies 285 and 290. In the illustrated example, the actuator means comprise two pneumatic cylinders 295, associated respectively to the upper half-die 285 and the lower half-die 290, as well as a mechanical-type toggle system associated to the upper half-die 285. The toggle system can comprise, in particular, a cam shaft 300, which is actuated in rotation by an electric gear-reducer 305, and acts directly on two guide columns 310 of the pneumatic cylinder 295 associated to the upper half-die 285.

When the sheet 905, supported by the belts 220, arrives in the profiling station 210, the two half-dies 285 and 290 are reciprocally distanced in such a way as to receive the sheet 905 interposingly between them (as in FIG. 8). At this point, the two half-dies 285 and 290 are respectively lowered and raised by the pneumatic cylinders 295, so as to close on the sheet 905. When the two half-dies 285 and 290 are closed or nearly closed, the lower half-die 290 is blocked in the raised position, for example by means of a pneumatically-controlled mechanical block, after which the gear reducer 305 actuates the cam shaft 300, so as to further push the upper half-die 285 towards the lower half-die 290, guaranteeing the pressure necessary for impressing on the sheet 905 the desired shape. Lastly, the two half-dies 285 and 290 are newly distanced so as to enable the belts 220 to advance the sheet towards the transfer station 215.

Figure 12:
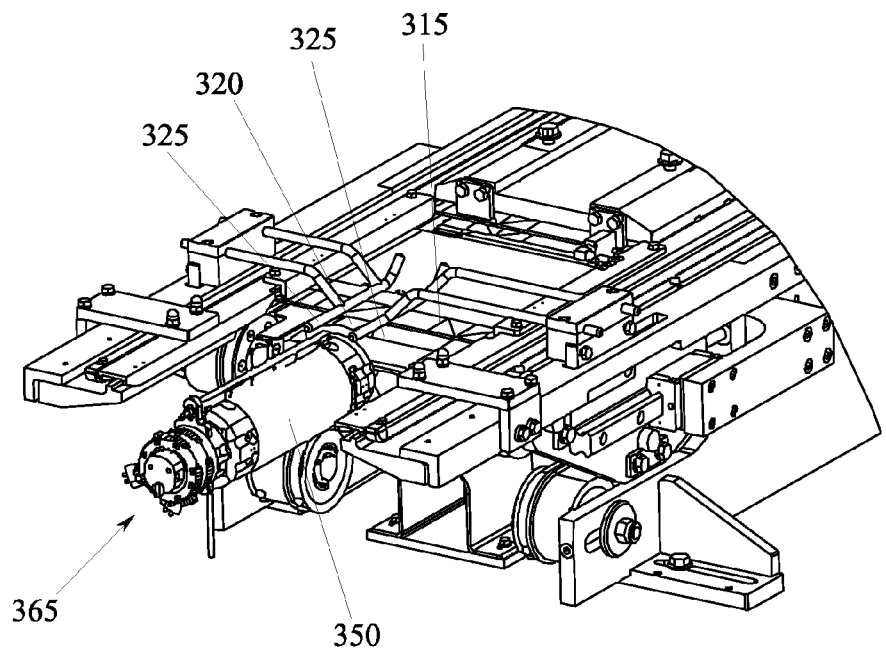
FIG. 12 is a perspective view of the group illustrated in FIG. 10, showing also the terminal tract of the first work apparatus of the machine.
Figure 13:
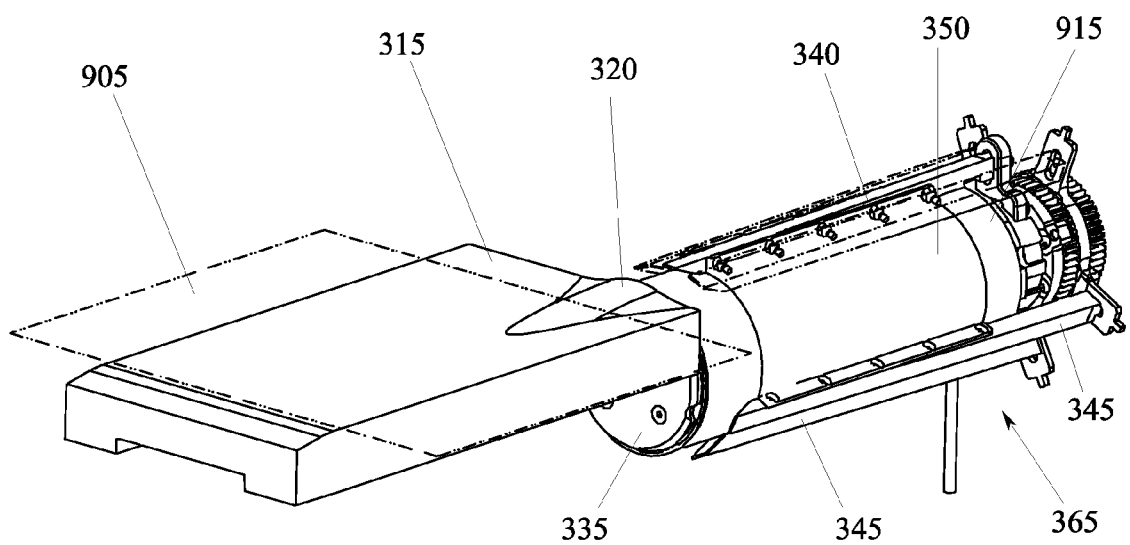
FIG. 13 is a perspective view of the group illustrated in FIG. 10, shown from a different angle and partly simplified.

The transfer station 215 is provided with guide means, which are able to cooperate with the belts 220 so as to give the sheet an at least slightly arched shape. As can be seen in FIGS. 12 and 13, the guide means can comprise a plane 315 positioned, at the transfer station 215, in the space comprise between the two belts 220 and substantially at a same height thereas, or possibly at a slightly lower height, which exhibits, at the end thereof, a convex central relief 320. The guide means can further comprise two skates 325 positioned above the plane 315, at a slightly higher level than the belts 220, which are arranged in plan view on opposite sides with respect to the central relief 320. In this way, the sheet 905 which arrives in the transfer station 215 pushed by the belts 220, inserts between the plane 315 and the skates 235, sliding in contact with the central relief 320. With this relative movement, the sheet 905 which moves in outlet from the transfer station 215 thus assumes a slightly arched shape.

Figure 5:
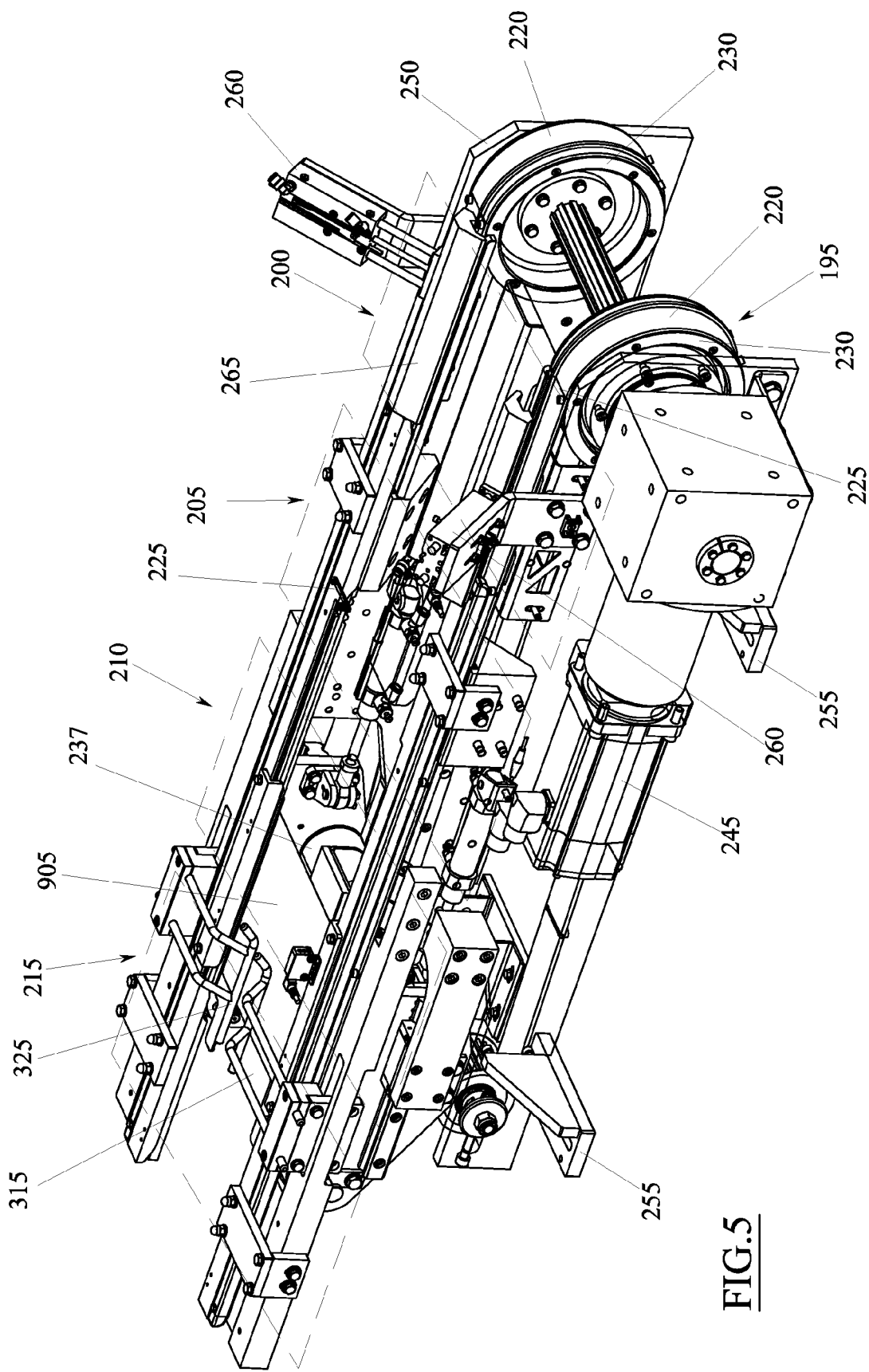
FIG. 5 is a perspective view of the transport means belonging to a first work apparatus of the machine of FIG. 1.
Figure 6:
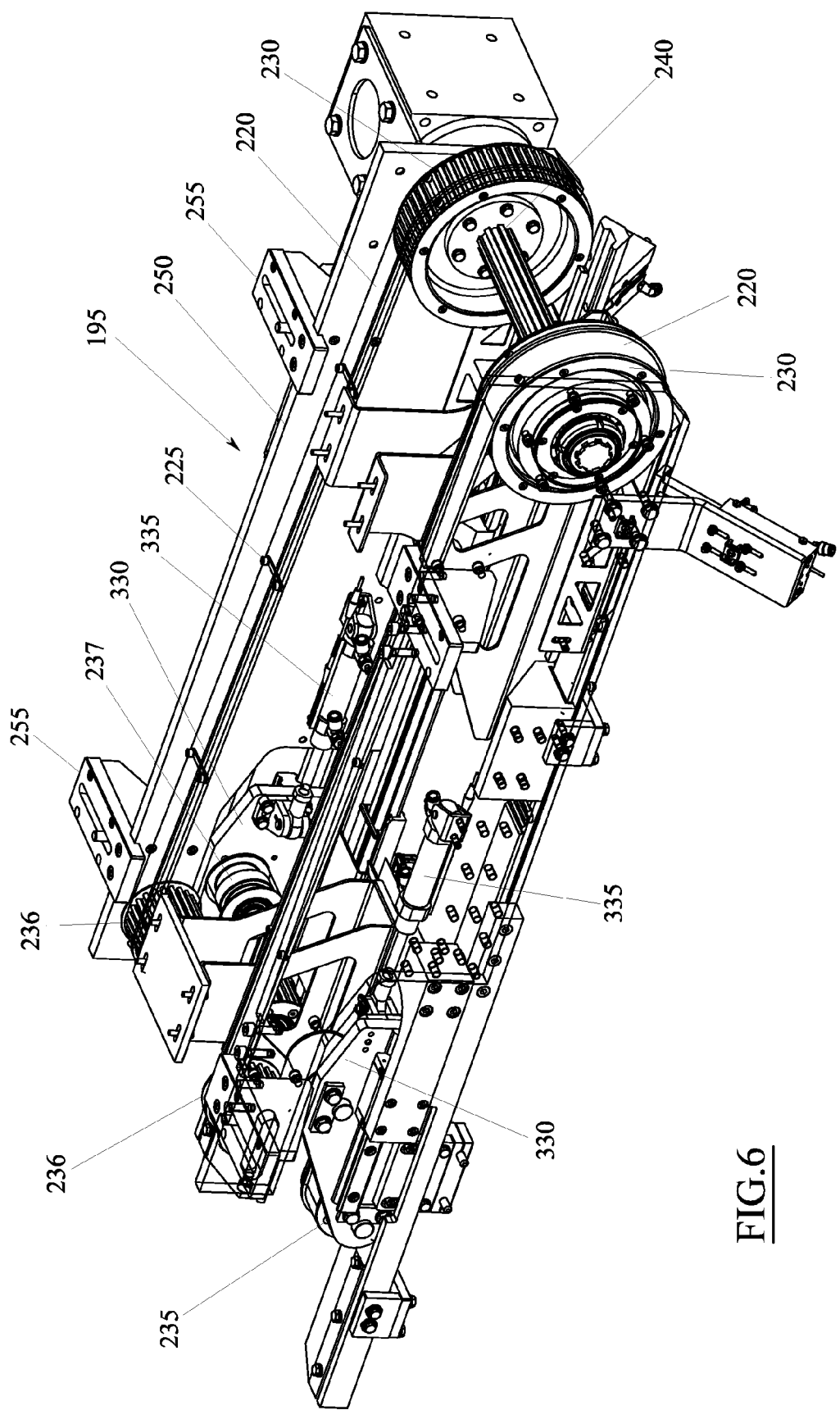
FIG. 6 is a perspective view from below of the transport means shown in FIG. 5.

It is further observed that at the transfer station 215 the belts 220 are retractable starting from the extended configuration shown in the FIGS. 5, 6 and 12 towards a retracted configuration (not shown), displacing in an opposite direction with respect to the advancing direction of the sheets 905, and vice versa. This displacement of the belts 220 is enabled by the fact that the upper relay pulley 235 and the intermediate pulley 237 of each belt 220 are mounted on a cursor 330 (see FIG. 6) which, actuated by a respective pneumatic cylinder 335, can be moved forwards and backwards along the sheet advancement direction. As will be explained in the following, this movement is useful for releasing the sheets on the second work apparatus 115.

Figure 9:
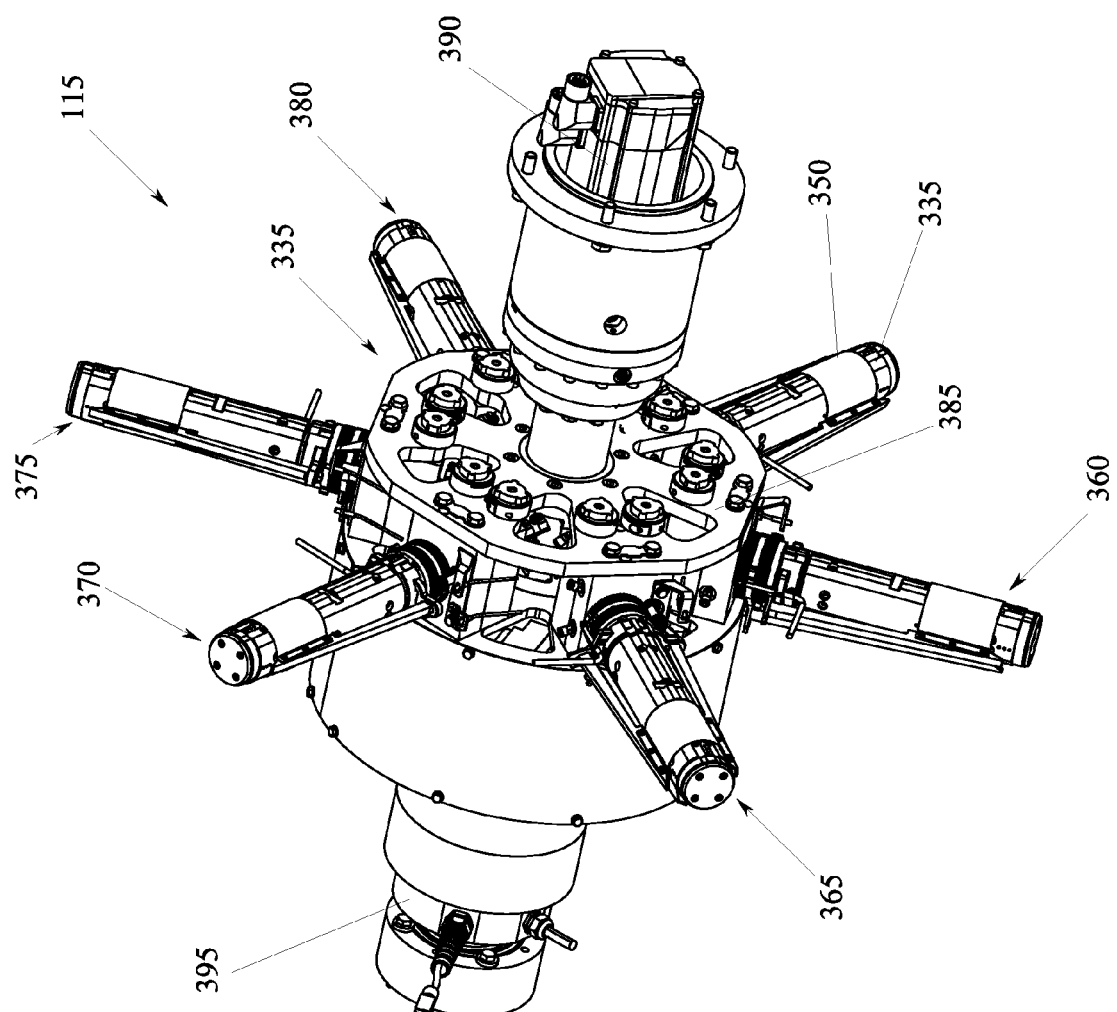
FIG. 9 is a perspective view of a second work apparatus of the machine of FIG. 1.

As illustrated in FIG. 9, the second work apparatus 115 generally comprises a plurality of support cores 335, each of which is provided with enveloping means for winding about the core a sheet in arrival from the first work apparatus 110. In particular (see FIGS. 10, 11 and 13), each support core 335 is defined by a substantially cylindrical body and a length of about identical to the length of the sheet to be wound thereon. The enveloping means primarily comprise a retaining element 340, which is conformed as a bar which develops by a flank of the support core 335 and parallel to the central axis thereof. The retaining element 340 is constrained to the support core 335 by means of kinematic means which enable a nearing/distancing displacement thereof in a radial direction, i.e. transversal with respect to the axis of the support core 335. The enveloping means further comprise two enveloping elements 345, each of which is also conformed as a bar that develops by a flank of the support core 335 and parallel to the central axis thereof.

Figures 10, 11:
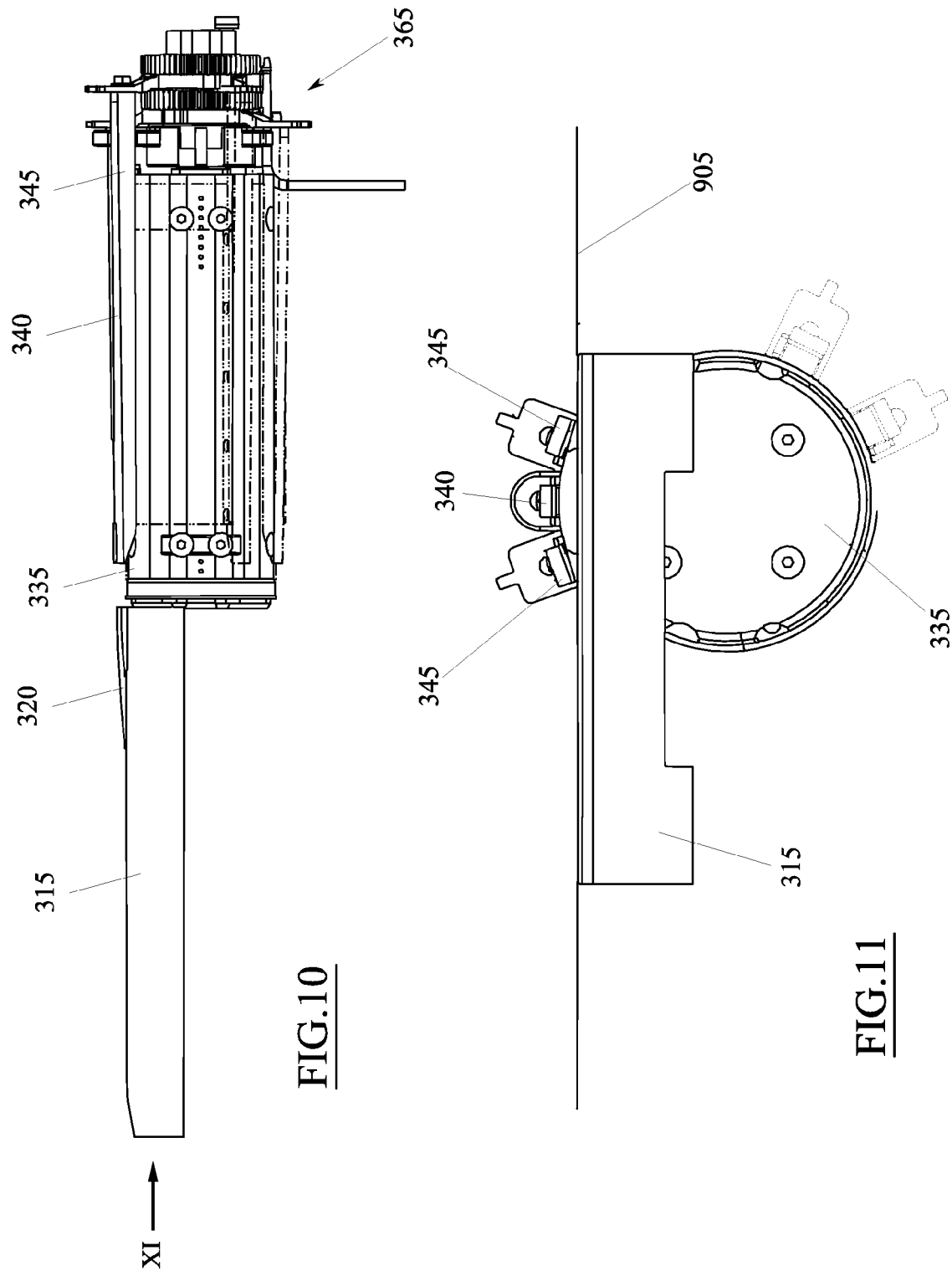
FIG. 10 is a lateral view of a support core of the second work apparatus of FIG. 9 in a reference station.
FIG. 11 is the view along XI of FIG. 10.

The enveloping elements 345 are positioned on opposite sides with respect to the central retaining element 340 and are constrained to the support core 335 by means of kinematic means which enable them to rotate about the axis of the support core 335 in opposite directions, up to reaching the positions illustrated with a broken line in FIG. 11. The enveloping means can further comprise a pair of curtain arms 350 (see FIG. 13), each of which has an edge constrained to the central retaining element 340 and an opposite edge constrained to a respective enveloping element 345. The support cores 335 are managed "by format", i.e. they can be replaced according to the dimensions of the sheet and therefore of the diameter of the pack to be realized.

Returning to FIG. 9, the second operating apparatus 115 further comprises movement means 355 able to advance the support cores 335 by steps, halting them time by time in a succession of work stations, which in order comprise an equipping station (optional), a sheet receiving station 365 of the sheet 905 from the first work apparatus 110 and an enveloping station thereof on the support core 335, two successive fixing stations 370 and 375, and lastly a transfer station 380 of the sheet to the third apparatus 120.

In the illustrated example, the movement means 355 in particular comprise a rotor 385, having a horizontal axis perpendicular to the advancement direction of the belts 220 of the first operating apparatus 110 (see also FIG. 1), which is actuated by an electric gear reducer 390, for example a brushless gear reducer. The support cores 335 are fixed projectingly to the lateral wall of the rotor 385, with respect to which they are arranged radially and spoke-fashion, angularly equidistant from one another. As they are mounted to a rotary element, all the electric and pneumatic users which are connected to the support cores 335 are powered via a rotary joint 395.

Figure 18:
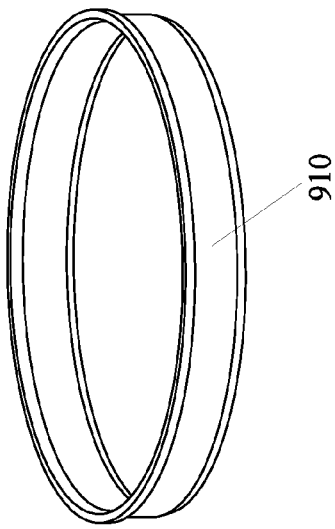
FIG. 18 is a perspective view of a reinforcing ring.
Figure 16:
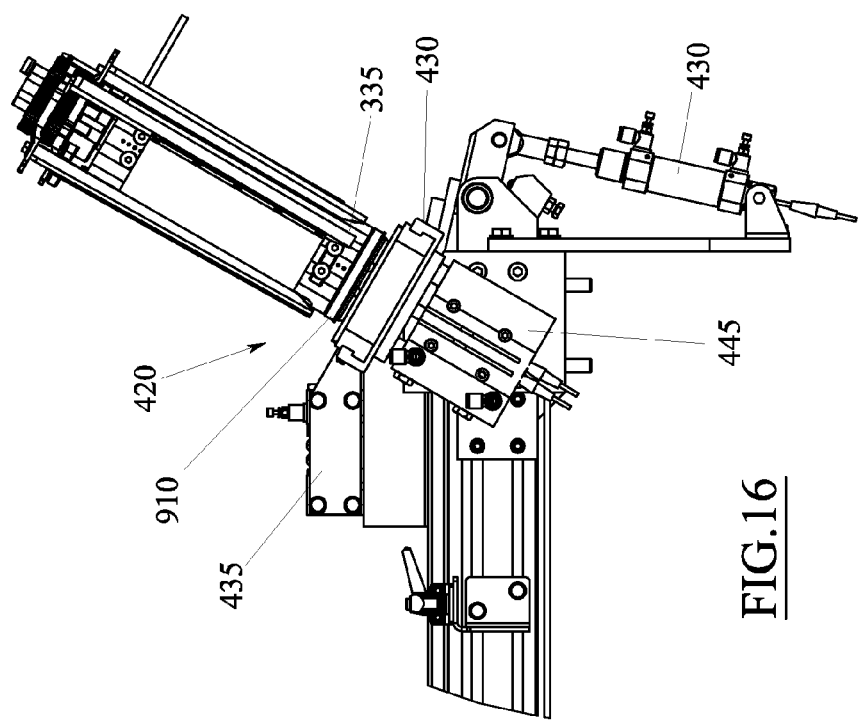
FIG. 16 is the detail of FIG. 15 shown in lateral view.

As illustrated in FIG. 14, the equipping station 360 is generally provided with means 400 for inserting on the free end of the support core 335 a reinforcing collar 910, for example an annular body made of plastic (see FIG. 18). These means 400 can comprise a vibrating basin 405, in which the operators loosely load a multiplicity of reinforcing collars 910. The vibrating bowl 405 is able to orientate the reinforcing collars 910, sending them in line to a conveyor belt 410, which is motorized by an electric gear reducer 415, for example an asynchronous gear reducer. The vibrating bowl 405 and the guides containing the reinforcing collars 910 on the conveyor belt 410 are adjustable according to format, i.e. they can be adjusted to process reinforcing collars 910 having different external diameters. The conveyor belt 410 supplies a row of reinforcing collars 910 to an inserting group 420, which is positioned at the equipping station 360, in proximity of the support core 335. The inserting group 420 comprises a blade 425 which, actuated by a pneumatic cylinder 430, is able to lift the first reinforcing collar 910 of the row, rotating it by about 30°. The reinforcing collar 910 is then translated horizontally by a pneumatically-actuated presser 435 which transfers it internally of a cup 440 (see FIG. 16).

Figure 17:
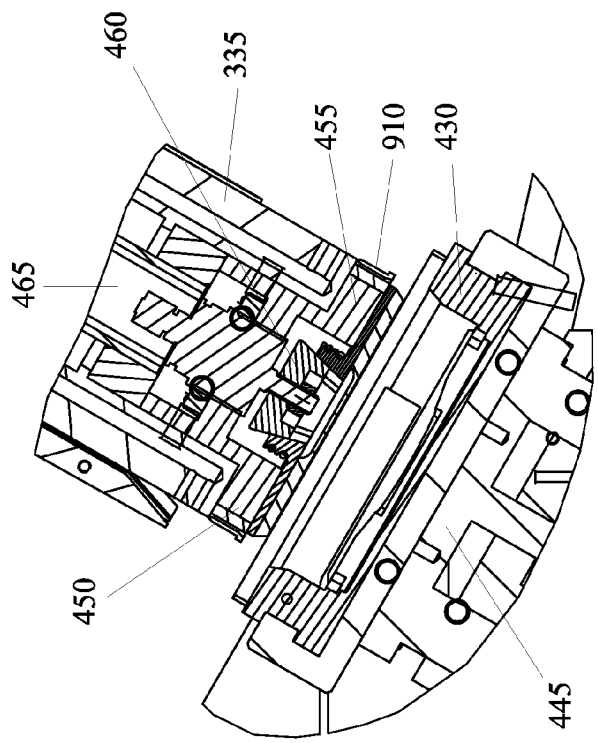
FIG. 17 is a detail of FIG. 16, shown in section.

Internally of the cup 440, the reinforcing ring 910 is in axis with the support core 335, which is in the equipping station 360. The insertion of the reinforcing collar 910 on the support core 335 is therefore achieved by means of a pneumatically-actuated piston 445 which pushes it from below. In order to retain the reinforcing collar 910, each support core 335 comprises, in proximity of the free end thereof, an expansion clamp 450 (see FIG. 17). The expansion clamp 450 can comprise a plurality of sectors 455 which are selectively distanced from one another in a radial direction from a central cone 460, which is translated axially by a pneumatic cylinder 465. In this way, after the expansion of the clamp 450, the reinforcing ring 910 is solidly constrained to the support core 335 and the piston 445 returns into the initial position, such that the rotor 385 can bring the support core 335 into the successive receiving and enveloping station 365. The equipping station 360 described in the foregoing is "optional", because the pack can be formed with the collar made of a polymer material or without a collar.

Figure 19:
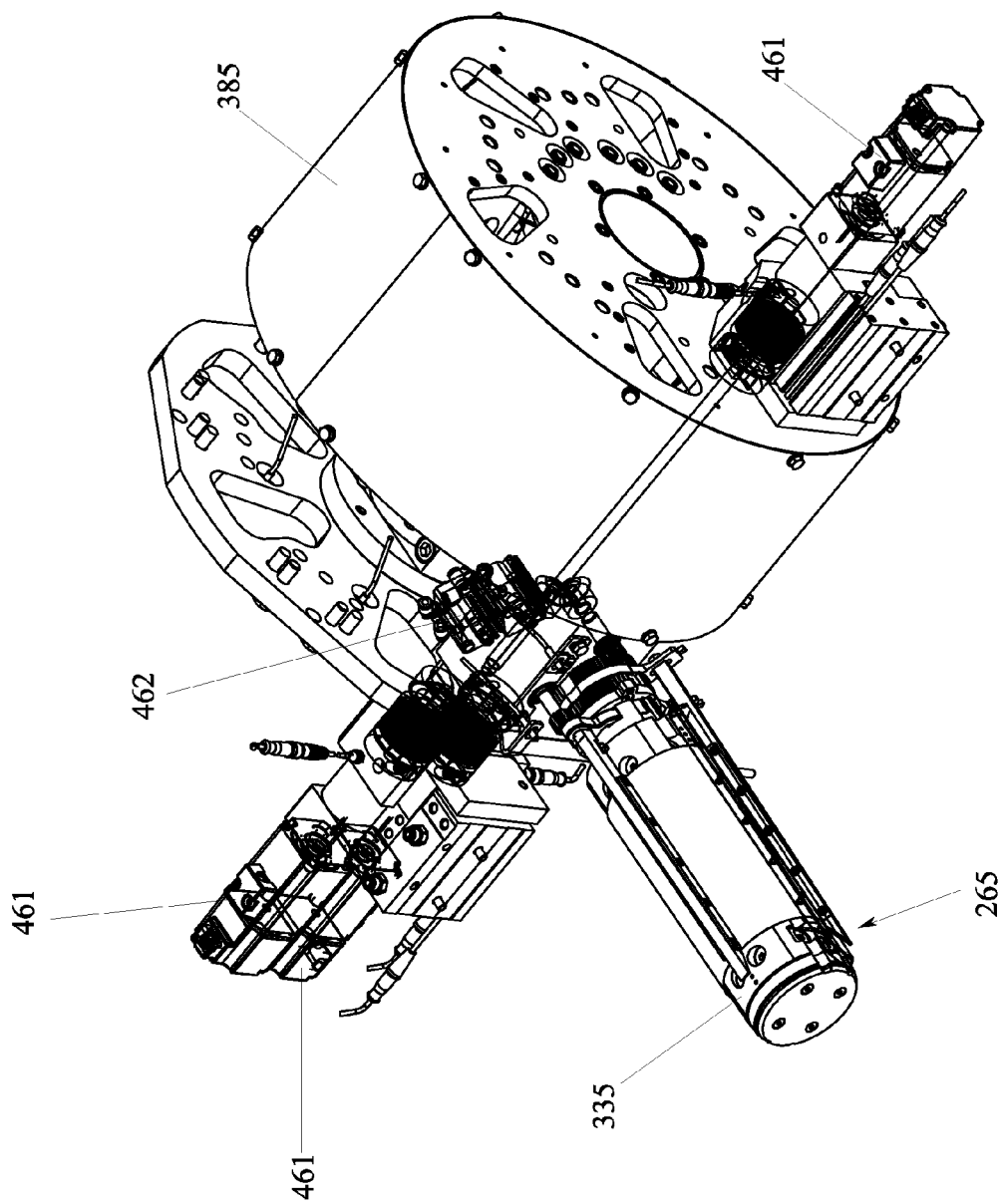
FIG. 19 is a perspective elevation of a support core of the second work apparatus in the receiving station.

As shown in figures from 10 to 13, in the receiving and enveloping station 365 the support core 335 is arranged in the space comprised between the belts 220, at the transfer station 215 of the first work apparatus 110, substantially at the same height as the plane 315. In particular, the support core 335 is arranged with a parallel axis to the advancing direction of the sheet 905 and with the free end immediately by a flank of the edge of the plane 315. When the support core 335 reaches this position, the belts 220 of the first work apparatus 110, with the aid of the bearers 225, advance the sheet 905 on the plate 315, such as to make it assume the slightly convex shape described in the foregoing, and bring it about the support core 335, inserting it at the same time below the central retaining element 340 and below both the enveloping elements 345 (see FIG. 11). At this point the central retaining element 340 is lowered such as to clamp the sheet 905 against the lateral surface of the support core 335. Immediately following this, the belts 220 with the bearers 225 are retracted (thanks to the system described herein above), so as to distance from the sheet which remains thus constrained only to the support core 335. At this point, the enveloping elements 345 start moving about the support core 335, taking with them also the two curtain arms 350. As illustrated in FIG. 19, the central retaining element 340 and the two enveloping elements 345 are activated independently by respective electric motors 461, for example brushless motors, which are mounted in a fixed position with respect to the rotor 385 and selectively engage with the kinematic means of the support core 335 by means of mobile joints. The movement of the enveloping elements 345 is such that the sheet 905 winds about the support core 335 and the reinforcing collar 910 (if present), forming a tubular blank 915 which is retained also by the curtain arms 350. In particular, the dimensions of the sheet and the diameter of the support core 335 are selected such that following the enveloping the lateral flaps of the tubular blank 915 are at least partially superposed on one another (see FIG. 13). At the same time, the enveloping elements 345 are configured so as to halt at a certain distance from one another (see the position represented in dotted lines in FIG. 11), and in such a position as to leave the superposed lateral flaps of the tubular blank 915 uncovered externally. Once this final position has been reached, the enveloping elements 345 and also the retaining element 340 are blocked in position by two pneumatic cylinders 462 (see FIG. 19), so as to be able to disengage the gear reducers 461 and enable the rotor 385 to perform the rotation bringing the support core 335 with the tubular blank 915 into the first fixing station 370.

Figure 20:
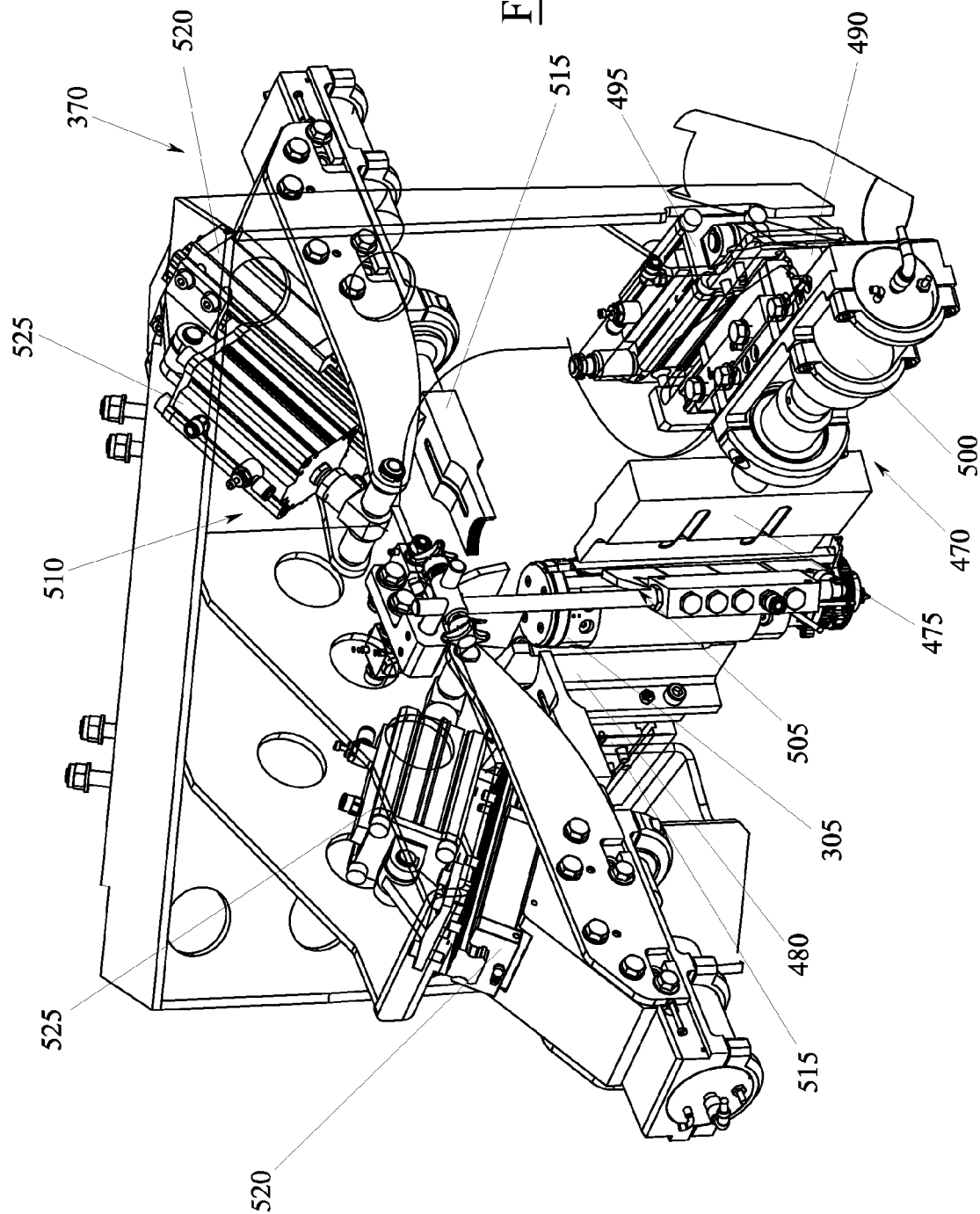
FIG. 20 is a perspective view showing a first fixing station of the second apparatus of the machine.
Figure 21:
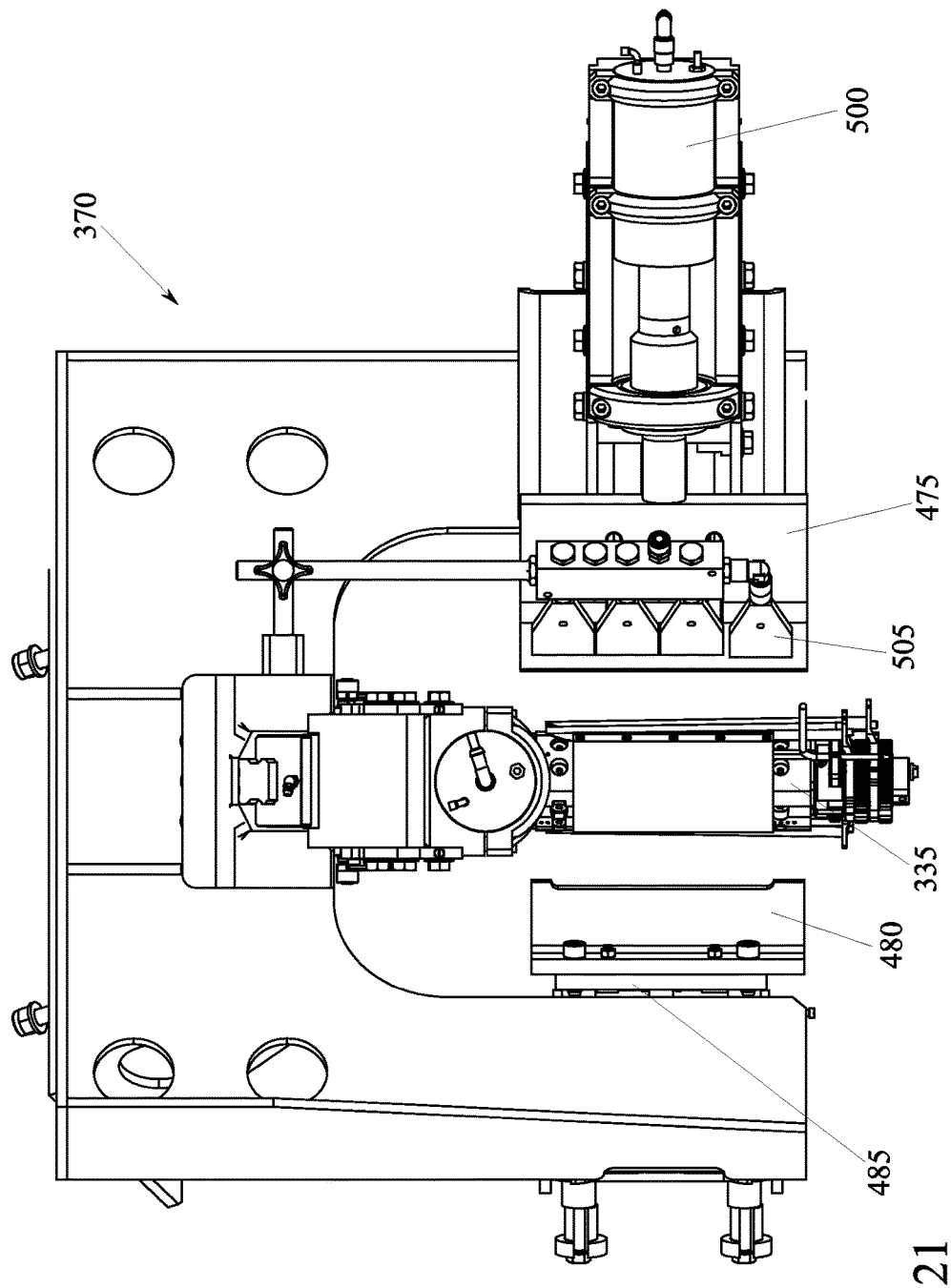
FIGS. 21 and 22 are two lateral views of the group of FIG. 20.

As illustrated in FIGS. 20 and 21, the first fixing station 370 is generally provided with means 470 for reciprocally joining the lateral and superposed flaps of the tubular blank 915 enveloped on the support core 335, for example ultrasound welding means. The ultrasound welding means can comprise actuator means able to selectively clamp the support core 335 between a sonotrode 475 and a contrast element 480. The sonotrode 475 is conformed substantially as a plate, having a straight end edge, orientated parallel to the axis of the support core 335 and radially aligned with the lateral superposed flaps of the tubular blank 915. The contrast element 480 is also plate-shaped, and is arranged substantially coplanarly to the sonotrode 475. The contrast element 480 is directed actuated by a pneumatic cylinder 485, while the sonotrode 475 is mounted on the roller guide 490 and is actuated by its own pneumatic cylinder 495. After the support core 335 has arrived in the first fixing station 370, the pneumatic cylinder 495 nears the sonotrode 475 radially to the axis of the support core 335, inserting between the enveloping elements 345 which are still in the retained position, up to bringing the straight end edge into contact with the superposed flaps of the tubular blank 915. At the same time, the pneumatic cylinder 485 brings the contrast element 480 into contact with the opposite part of the tubular blank 915, so as to oppose the pressure exerted by the sonotrode 475 and not to damage the support core 335. At this point, the sonotrode 475 is set in vibration with an ultrasound frequency by a vibration generator 500, for example a piezoelectric transducer. This vibration generates friction between the superposed flaps of the tubular blank 915, producing sufficient heat to locally melt the polythene of the material and thus obtain a longitudinal welding of the two lateral flaps. Following this welding, the pneumatic cylinders 485 and 495 distance the sonotrode 475 and the contrast element 480, while means for blowing air 505 can enter into operation, in such a way as to rapidly cool the welding bead, improving the efficiency thereof.

Figure 22:
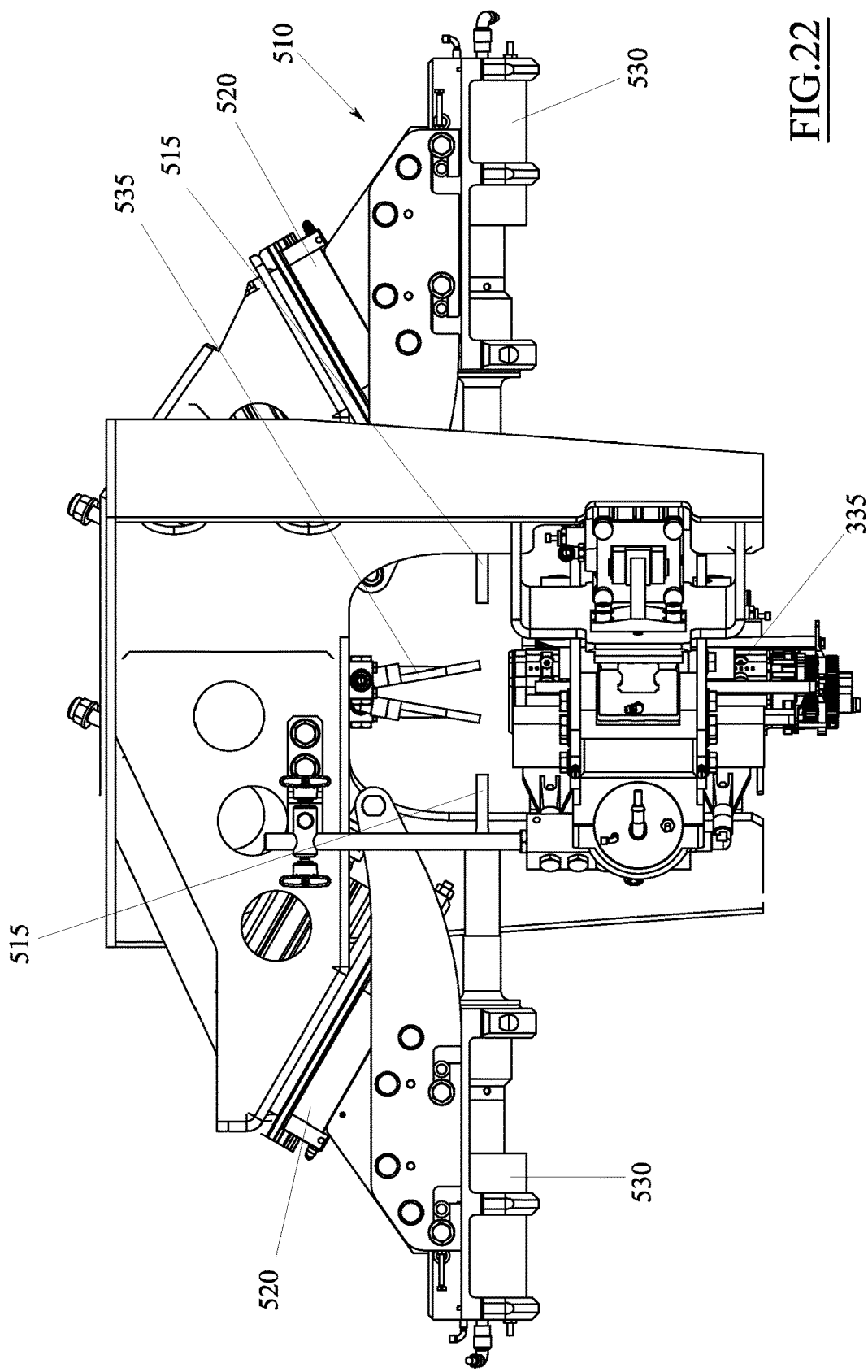
Figure 23:
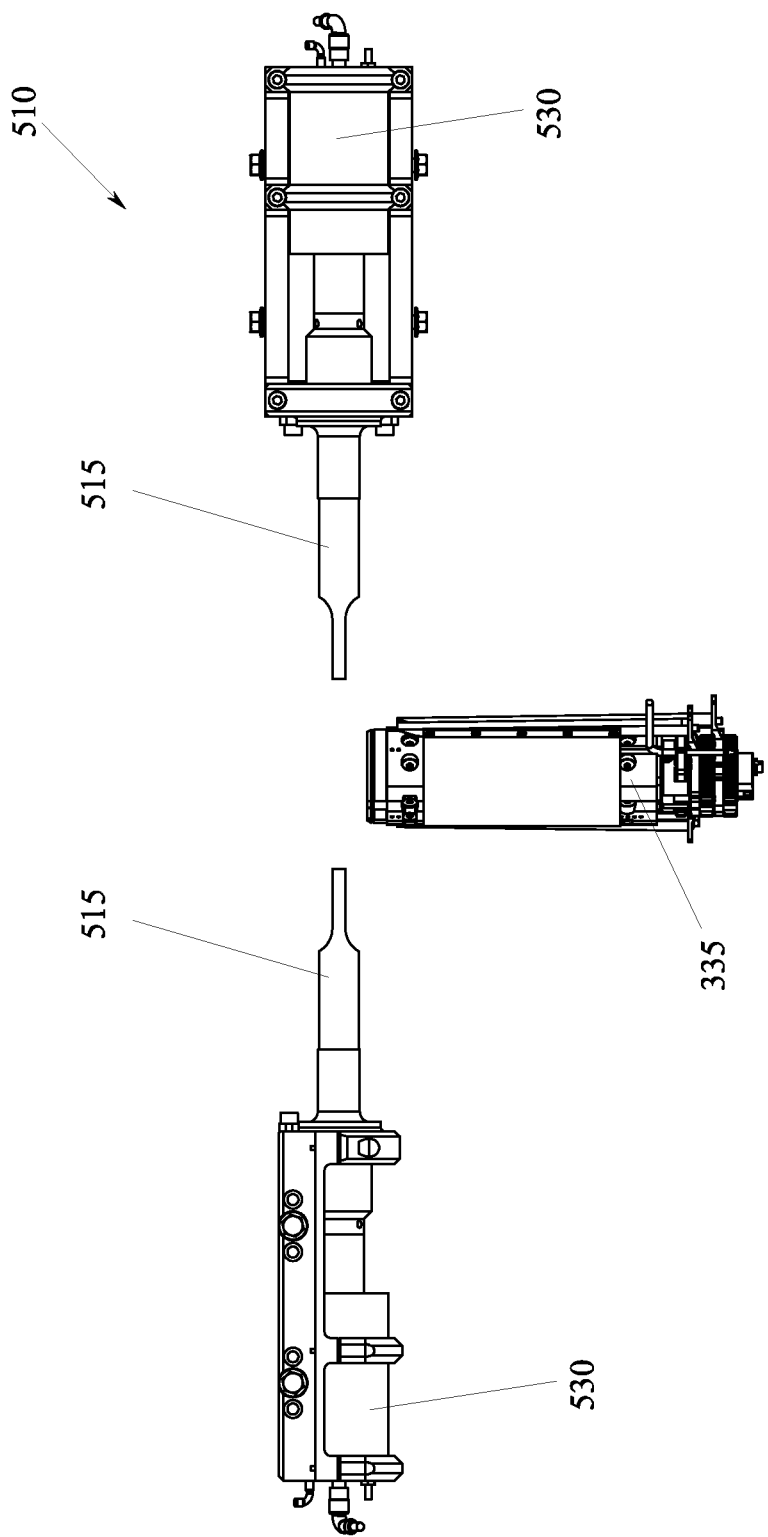
FIG. 23 is the view of FIG. 22, in which only some elements of the group are highlighted.

The fixing station 370 can also be provided with means 510, for example further ultrasonic welding means, for joining the reinforcing ring 910 (if present) to the tubular blank 915 which is enveloped about the support core 335. These means 510 can comprise actuator means for selectively clamping the free end of the support core 335 between two sonotrodes 515. Each sonotrode 515 is conformed substantially as a plate lying in a perpendicular plane to the axis of the support core 335, and having an arched edge conformed substantially as an arc of circumference having a radius about identical to the radius of the support core 335. The two sonotrodes 515 are positioned on opposite sides of the support core 335 (see FIGS. 22 and 23), such that the concavities of the arched edges thereof are facing one another and both facing towards the central axis of the support core 335. Each sonotrode 515 is mounted on a respective roller guide 520 and is actuated by a respective pneumatic cylinder 525 (see FIG. 20). After the support core 335 has arrived in the first fixing station 370, the pneumatic cylinders 525 near the sonotrodes 515 radially to the axis of the support core 335, up to bringing the arched edges in contact with the part of the tubular blank 915 that is at the free end of the support core 335, i.e. which envelops the reinforcing ring 910. As the sonotrodes 515 are positioned on opposite sides, the pushes exerted thereby compensate one another, without stressing and damaging the support core 335. At this point, the sonotrodes 515 are set in vibration with an ultrasound frequency by a respective generator of vibrations 530, for example a piezoelectric transducer. This vibration generates friction between the portions of the tubular blank 915 in contact with the sonotrodes 515 and the reinforcing ring 910, producing heat sufficient to weld them together. When this step is completed, the pneumatic cylinders 525 distance the sonotrodes 515, while means 535 (see FIG. 22) able to blow air at high pressure directly into the zone of the reinforcing ring 910 can enter into operation, so as to cool the weld seam rapidly, thus improving the efficiency thereof. Owing to the conformation of the sonotrodes 515, this welding step enables welding only two diametrically opposite portions of the edge of the tubular blank 915, but not the whole perimeter of the edge. For this reason, the following rotation of the rotor 385 is able to take the support core 335 into the second fixing station 375.

Figure 24:
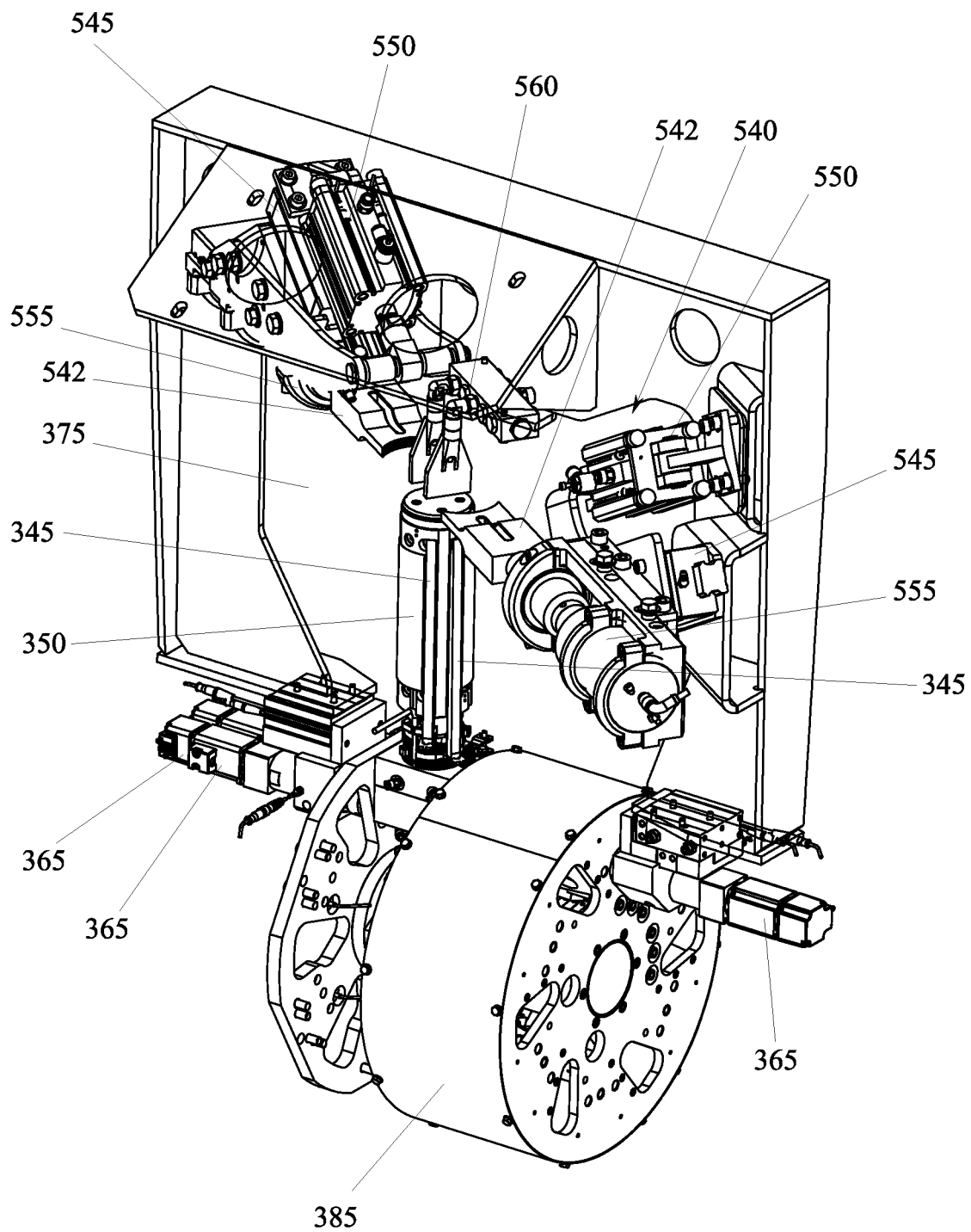
FIG. 24 is a perspective view showing a second fixing station of the second apparatus of the machine.

As illustrated in FIG. 24, the second fixing station 375 is provided with further means 540, for example further ultrasound welding means, which are able to join the reinforcing collar 910 to the tubular blank 915, at the zones that are not welded in the first station 370. As before, the means 540 can comprise actuator means able to selectively clamp the free end of the support blank 335 between two sonotrodes 542. Each sonotrode 542 is conformed substantially as a plate and lies in a perpendicular plane to the axis of the support core 335, and has an arched edge conformed substantially as an arc of circumference having a radius about identical to the radius of the support core 335. The two sonotrodes 542 are positioned on opposite sides of the support core 335, such that the concavities of the arched edges thereof are facing one another and both towards the central axis of the support core 335. With respect to the preceding sonotrodes 515, the sonotrodes 542 are however angularly rotated by about 90° about the axis of the support core 335. Each sonotrode 542 is mounted on a respective roller guide 545 and is actuated by a respective pneumatic cylinder 550. After the support core 335 has arrived in the second fixing station 375, the pneumatic cylinders 550 near the sonotrodes 542 radially to the axis of the support core 335, up to bringing the arched edges thereof into contact with the part of the tubular blank 915 which is at the free end of the support core 335, i.e. which envelops the reinforcing ring 910, and precisely in the zones not previously welded. As the sonotrodes 542 are positioned on opposite sides, the pushes exerted thereon compensate one another, without stressing and damaging the support core 335. At this point, the sonotrodes 542 are set in vibration with an ultrasound frequency by a respective generator of vibrations 555, for example a piezoelectric transducer. This vibration generates friction between the portions of the tubular blank 915 in contact with the sonotrodes 542 and the reinforcing ring 910, producing sufficient heat to weld them together, and thus completing the welding of the reinforcing collar 910 on all the edge of the tubular blank 915. When this step is completed, the pneumatic cylinders 550 distance the sonotrodes 542, while means 560 able to blow air at high pressure directly into the zone of the reinforcing collar 910 can enter into operation, so as to cool the weld seam rapidly and improve the efficiency thereof.

Contemporaneously or immediately following the welding, the enveloping elements 345 which retain the tubular blank 915 begin moving about the support core 335, backwards towards the initial position in which they are side-by-side with the central retaining element 340, which is in turn distanced from the support core 335, freeing the press. In this way, the two curtain arms 350 are also re-furled, completely freeing the tubular blank 915. In this step, the central retaining element 340 and the two enveloping elements 345 are activated independently by respective electric motors 565, for example brushless motors, which are mounted in a fixed position with respect to the rotor 385 and selectively engage to the kinematic means of the support core 335 by means of mobile joints. When the activation is complete, the motors 565 are disengaged and the rotor 385 performs a new advancing step so as to place the support core in the transfer station 380.

Figure 25:
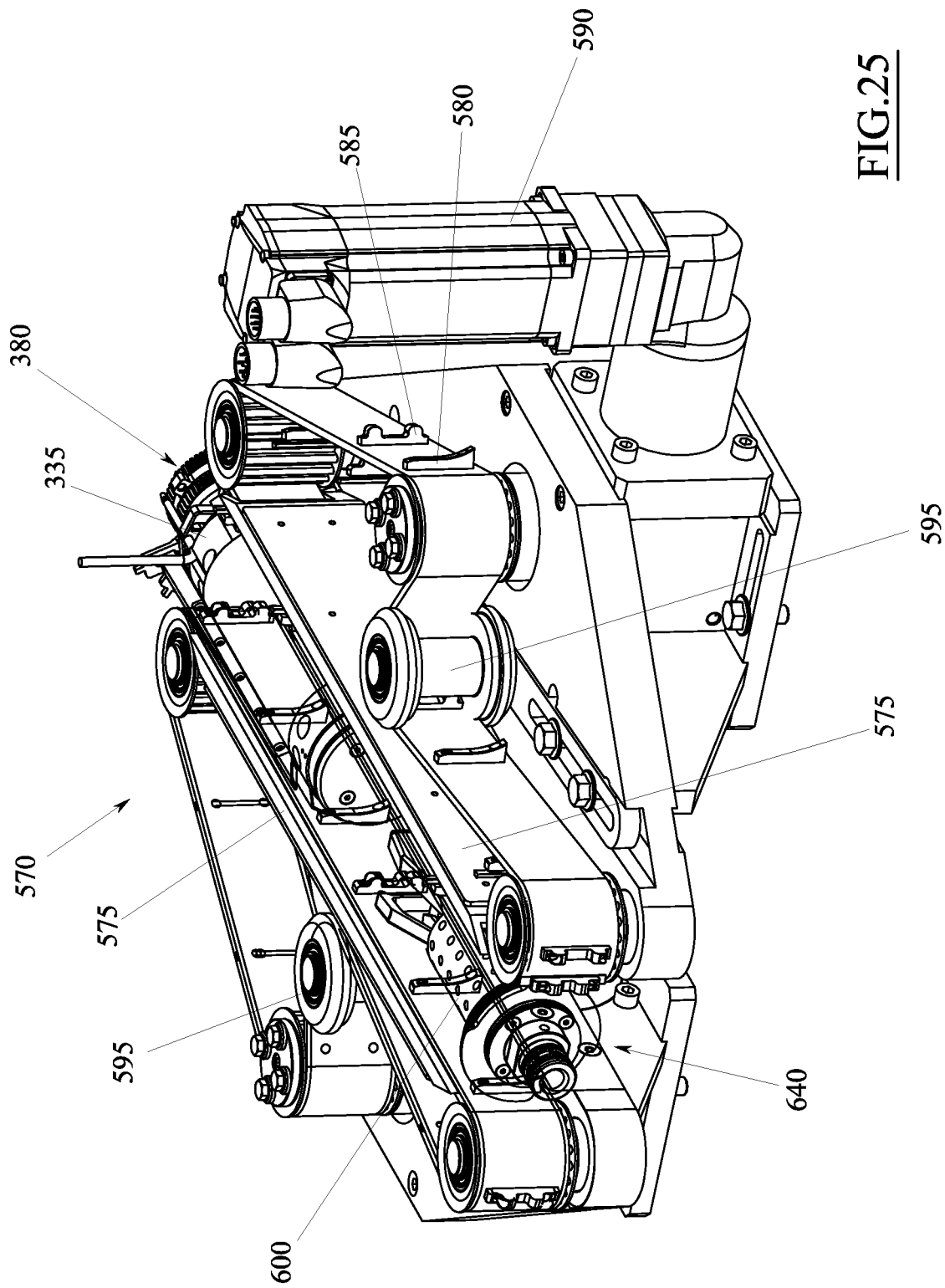
FIG. 25 is a perspective view showing transfer means located between the second and the third apparatus of the machine.

As illustrated in FIG. 25, transfer means 570 operate at the transfer station 380 which transfer means 570 having the function of removing the tubular blank 915 from the support core 335 and transferring it to the third work apparatus 120. In the illustrated example, the means 570 comprise two sliding belts 575, reciprocally facing one another and singly provided with support bearers 580 and pushers 585. The belts 575 are activated to move contemporaneously by a single electric gear reducer 590, for example a brushless gear reducer, by means of an appropriate transmission system. Each belt 575 is further wound on a respective position-adjustable stretcher pulley 595, which enables a rapid replacement of the belt. In this way the format-change operations are facilitated, which by the way include the replacement of the belts and the adjustment of the reciprocal distance thereof. When the support core 335 arrives in the transfer station 380, it positioned in the space comprised between the sliding belts 575, where the tubular blank 915 is extracted from the pusher 585 while it is laterally supported by the support bearers 580.

Figure 26:
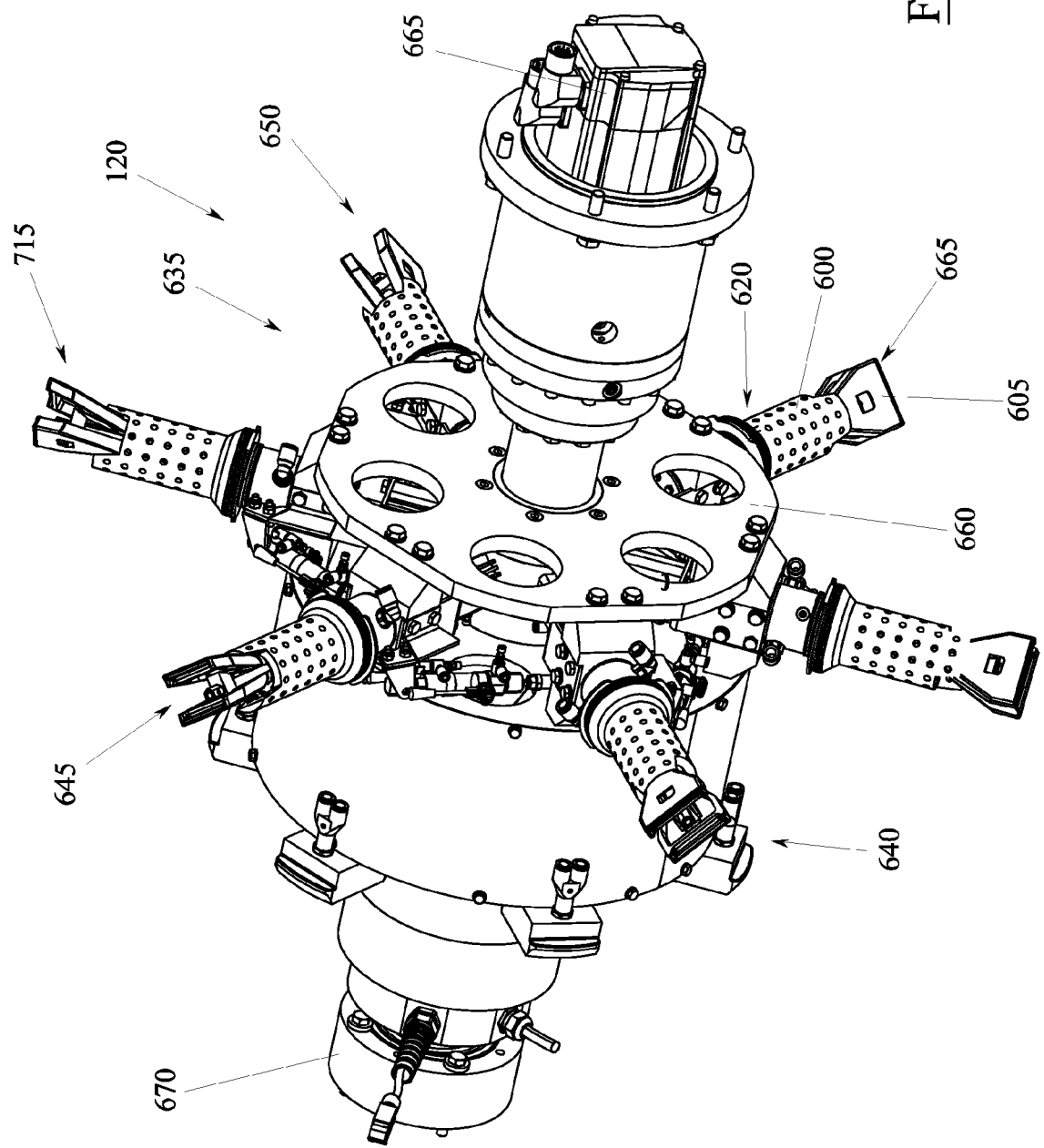
FIG. 26 is a perspective view of the third work apparatus of the machine of FIG. 1.
Figure 28:
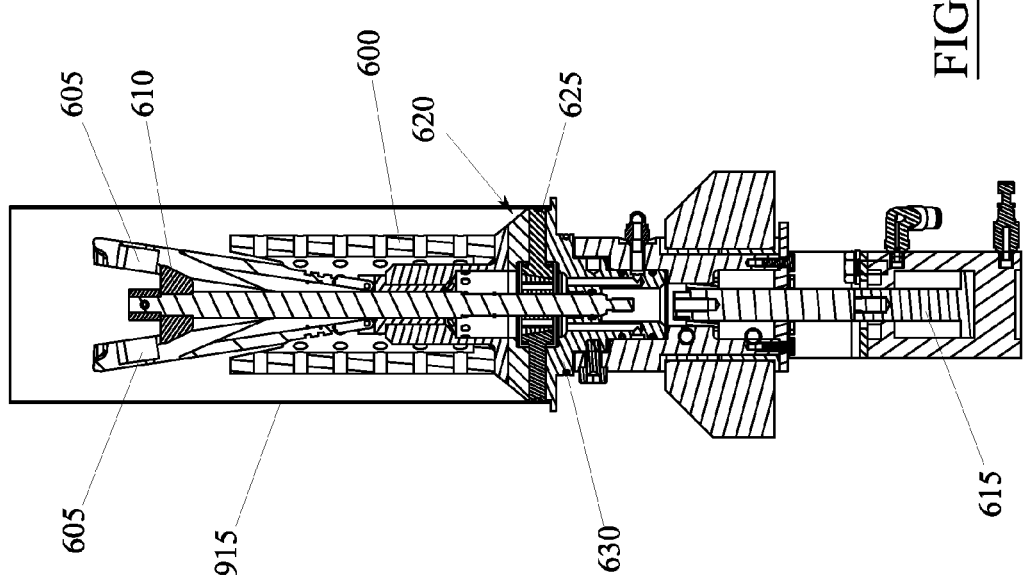
FIG. 28 is a section of the support core of FIG. 27.
Figure 27:
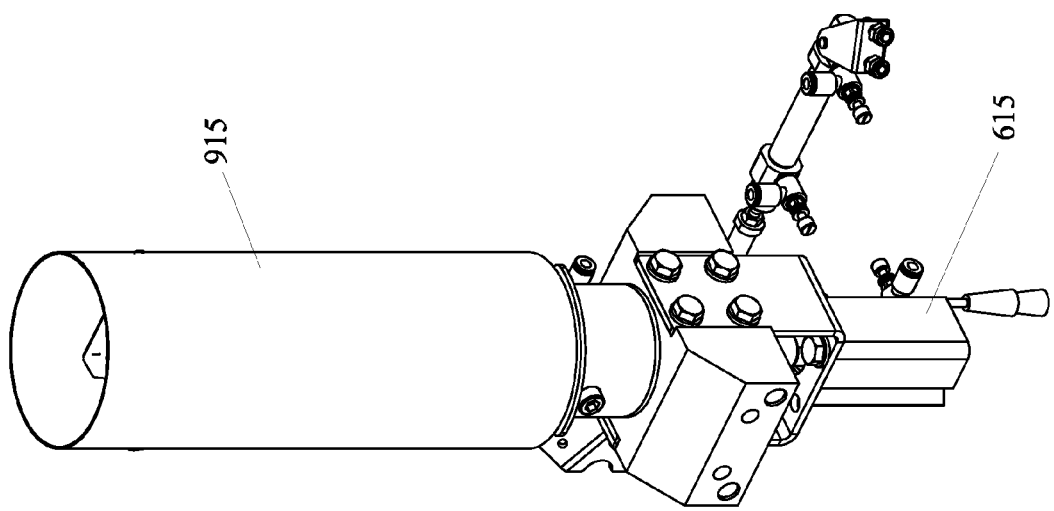
FIG. 27 is a perspective view of a support core belonging to the third apparatus of FIG. 26.

As illustrated in FIG. 26, the third work apparatus 120 comprises a plurality of support cores 600, each of which is defined by a substantially cylindrical shape, having a length that is generally inferior to the length of the tubular blank 915 formed in the second apparatus 115. The lateral wall of the support core 600 can be perforated, for reasons that will be explained in the following. A pair of profiled plates 605, reciprocally facing, can be housed internally of the support core 600 (see FIG. 28). In particular, each of the plates 605 exhibits a slim portion which inserts and is hinged to the inside of the support core 600, and a broadened portion, having a substantially rectangular shape, which axially projects from a first end of the support core 600. In this way, the two profiled plates 605 can move, with a reciprocal dividing movement with respect to the axis of the support core 600, between a closed position, in which they are substantially in reciprocal contact, and an open position, in which the broadened and projecting portions thereof are reciprocally distanced. This movement is actuated by a central cone 610, which is interposed between the profiled plates 605 and is translated axially by a pneumatic cylinder 615. Each support core 600 can further be provided with an expansion clamp 620, which is positioned at the second end of the support core 600, opposite the end from which the profiled plates 605 project. This expansion clamp 620 can comprise a plurality of sectors 625 which are selectively distanced from one another in a radial direction by a central cone 630, which is translated axially by the same pneumatic cylinder 615 which actuates the profiled plates 605. The support cores 600 are managed by format, i.e. they can be replaced according to the diameter and the length of the tubular blank 915.

Returning to FIG. 26, the third work apparatus 120 further comprises movement means 635 able to advance the support cores 600 by steps, halting, time-by-time and in a succession of work stations, which comprise, in order, a receiving station 640 of the tubular blank 915 from the second apparatus 115, a sealing station 645 of the bottom, a profiling station 650 (optional) and a release station 655.

In the illustrated example, the movement means 635 comprise in particular a rotor 660, having an axis that is horizontal and parallel to the rotor axis 385 of the second work apparatus 115, which is activated by an electric gear reducer 665, for example a brushless gear reducer. The support cores 600 are fixed projecting to the lateral wall of the rotor 660, with respect to which they are arranged radially in spoke-fashion and angularly equidistant to one another. In particular, the support cores 600 are mounted such that the expansion clamps 620 are in proximity of the rotor 660, while the profiled plates 605 are projecting from the free ends of the support cores 600. Being mounted on a rotary element, all the electric and pneumatic users connected to the support cores 600 are powered via a rotary joint 670.

As illustrated in FIG. 25, in the receiving station 640 the support core 600 is arranged in the space comprised between the sliding belts 575 of the transfer means 570 (described herein above) substantially aligned and coaxial with the support core 335 of the first work apparatus 110 which is in the transfer station 380. Owing to the sliding of the belts 575, the tubular blank 915 removed from the support core 335 is then immediately transferred and inserted on the support core 600 of the third work apparatus 120, on which the profiled plates 605 and the expansion clamp 620 are initially both in the closed configuration. When the tubular blank 915 is completely inserted on the support core 600, the end bearing the reinforcing collar 910 (if present) is positioned at the position of the expansion clamp 620, while the opposite bottom end surrounds the projecting portion of the profiled plates 605. At this point, the cylinder 615 simultaneously actuates the expansion of the clamp 620, which retains and stably blocks the tubular blank 915 by the reinforcing collar 910 (if present), and the opening of the profiled plates 605 which have the function of facilitating the subsequent forming of the bottom. When this stage is finished, the rotor 660 performs a rotation step in order to place the support core 600 in the sealing station 645.

Figure 29:
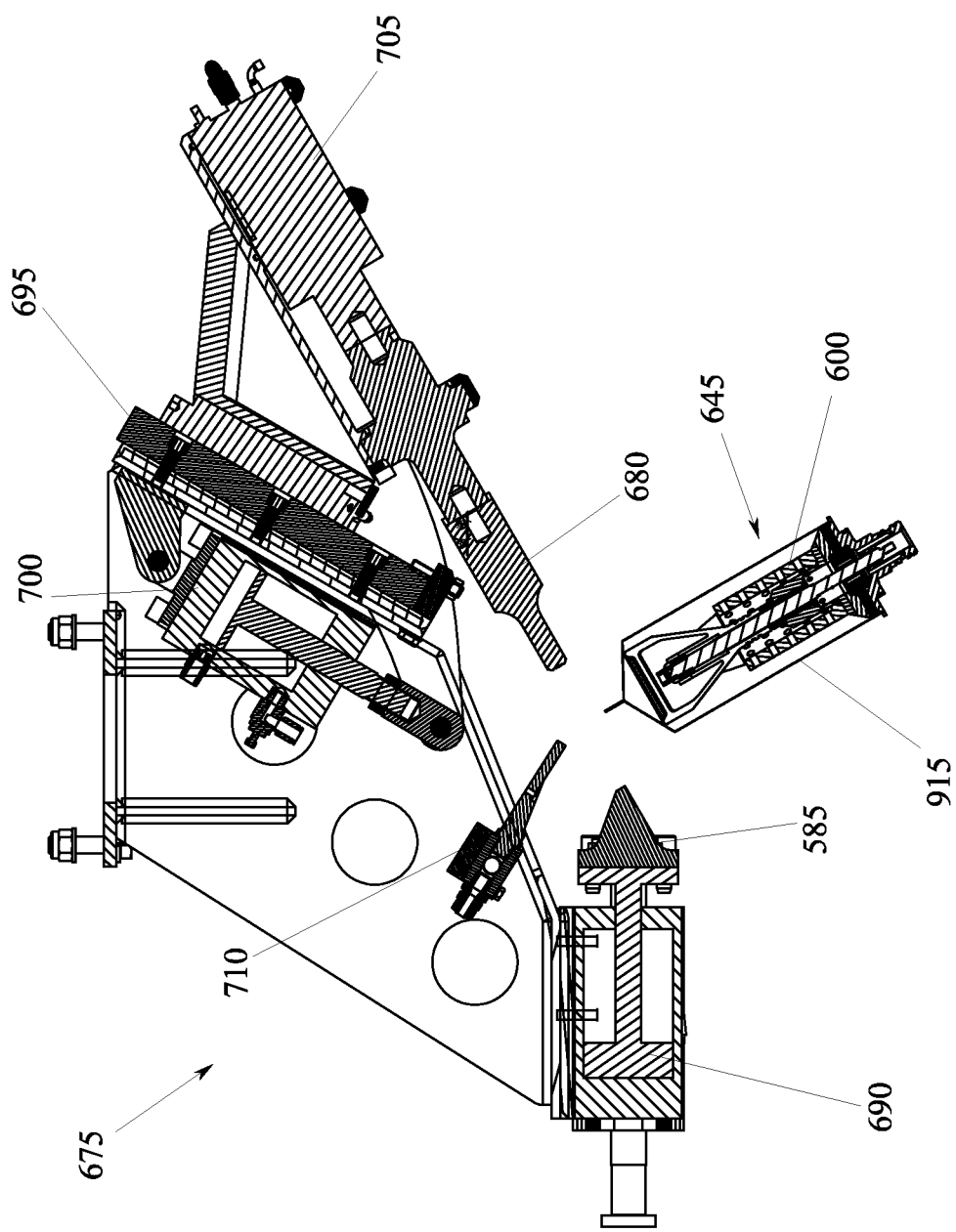
FIG. 29 is a section view of the means at a welding station of the bottom of the tubular blanks, belonging to the third work apparatus of the machine.

As illustrated in FIG. 29, the sealing station 645 generally comprises means 675 able to flatten the bottom end of the tubular blank 915, closing it and bringing two portions thereof into reciprocal contact, and joining the portions to one another, forming a rib. These means 675 can comprise ultrasound welding means. In particular, the means 675 can comprise actuator means able to selectively clamp the bottom end of the tubular blank 915 between a sonotrode 680 and a contrast element 685. The sonotrode 680 is substantially plate-shaped and has a straight end edge, orientated perpendicularly to the axis of the support core 600. The contrast element 685 is substantially wedge-shaped and is arranged in opposition to the sonotrode 680. The contrast element 685 is directly actuated by a pneumatic cylinder 690, while the sonotrode 680 is mounted on the roller guide 695 and is actuated by its own pneumatic cylinder 700. After the support core 600 has arrived in the sealing station 645, the pneumatic cylinders 690 and 700 both contemporaneously near the sonotrode 680 and the contrast element 685 radially towards the axis of the support core 600, but externally thereof, in such a way as to clamp the bottom end of the tubular 915. In this way, the bottom end is flattened and closed, bringing two portions thereof into reciprocal contact. At this point, the sonotrode 680 is set in vibration at an ultrasound frequency by a vibration generator 705, for example a piezoelectric transducer. This vibration generates friction between the in-contact portions of the tubular blank 915, producing sufficient heat to locally melt the polythene in the material and thus obtain a welded rib which seals the bottom of the tubular blank 915. Following the welding, the pneumatic cylinders 690 and 700 distance the sonotrode 680 and the contrast element 685, while the means 710 for blowing air directly on the welded rib can enter into operation, so as to cool the seam rapidly, improving the efficiency thereof. When this operation has been completed, the rotor 660 rotates in such a way as to move the support core 600 first towards an intermediate station 715 and thence, after an appropriate halt time, towards the profiling station 650.

Figure 31:
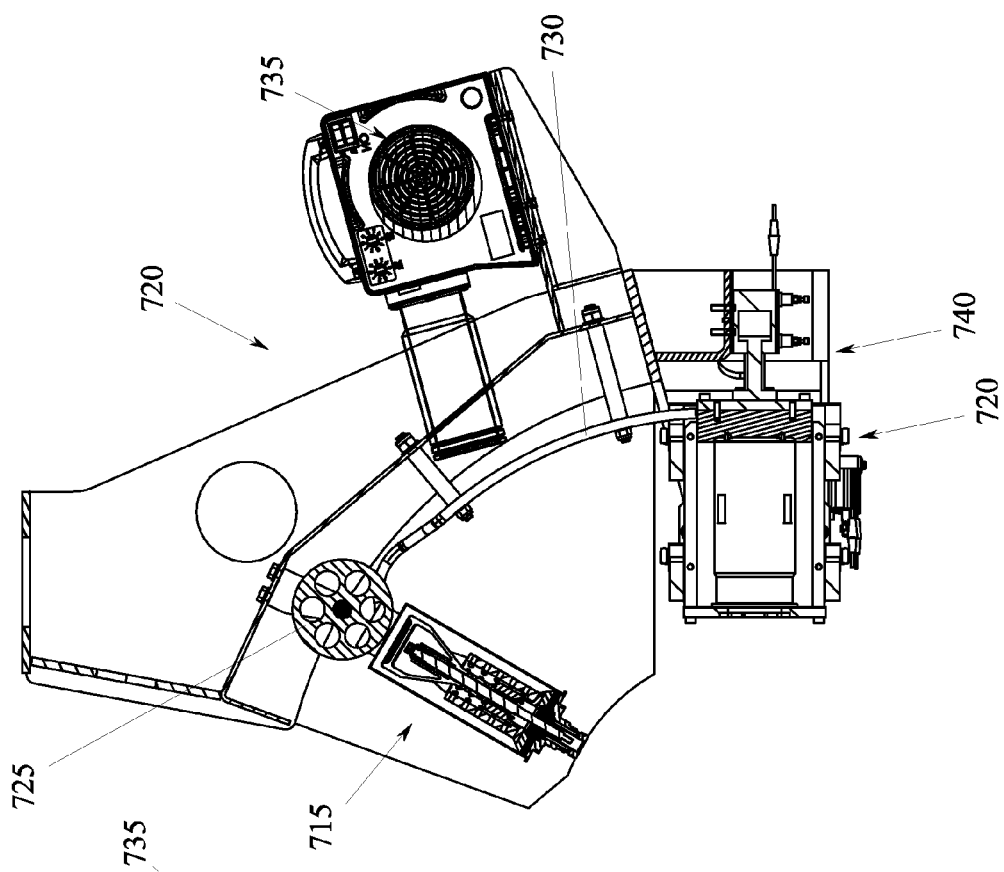
FIG. 31 is a lateral view of the means of FIG. 30.
Figure 30:
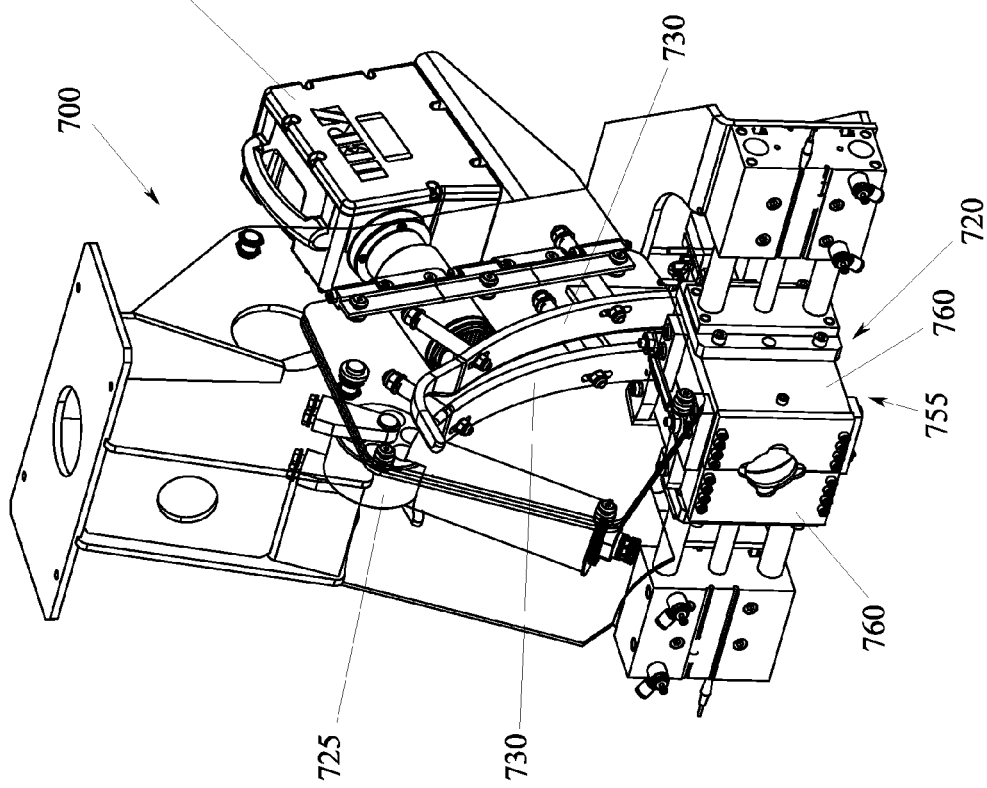
FIG. 30 is a perspective view of the folding means of the bottom of the tubular blanks, belonging to the third work apparatus of the machine.

As illustrated in FIGS. 30 and 31, between the sealing station 645 and the profiling station 650, the third work apparatus 120 comprises folding means 720, which are able to cooperate with the movement of the support core 600 between the stations, so as to fold the opposite ends of the rib below and towards the inside of the tubular blank 915. The folding means 720 can comprise a roller 725, which is located in a fixed position substantially at the intermediate station 715. The roller 725 exhibits a rotation axis parallel to the rotation axis of the rotor 660, from which it is separated by a smaller distance than the distance between the rotor axis and the bottom end of the tubular blank 915 supported by the support core 600. When the tubular blank 915 transits at the position of the roller 725, the roller 725 presses the rib obtained during the sealing backwards (with respect to the advancement direction) and towards the rotor axis 660, flattening and broadening the closed bottom of the tubular blank 915. In this way, the opposite ends of the rib contextually tend to flatten, forming tabs which partially project from the lateral surface of the tubular blank 915. The folding means 720 further comprise a pair of profiled guides 730, parallel to one another and developing in an arc downstream of the roller 725, between the intermediate station 715 and the profiling station 645. The guides 730 are arranged in such a way that a narrow space is defined between them, and they are shaped such that following the relative movement of the support core 600 on-board the rotor 660, the tabs of the tubular blank 915 pass first above the guides 730, being raised upwards, and then slide internally of the narrow space and are then guided to pass below the profiled guides 730, thus being folded internally of the tubular blank 915 and rested on the bottom thereof. Thanks to the contextual presence of the profiled plates 605 in the open configuration, this folding operation is overall able to give the bottom of the tubular blank 915 a substantially prismatic shape, for example having a substantially square or rectangular base. It is also specified that this folding operation is facilitated by the crease lines, which are printed on the sheet in the profiling station 210 of the first work apparatus 110, which identify the lines about which the tabs are folded. To facilitate the malleability of the material, the folding means 720 can also comprise means for heating the tubular blank 915. These means can comprise, for example, a heater 735, which can be positioned at the profiled guides 730 and be able to blow hot air towards the bottom of the tubular blank 915, maintaining it at a temperature comprised about between 60° and 80° Celsius.

Figure 33:
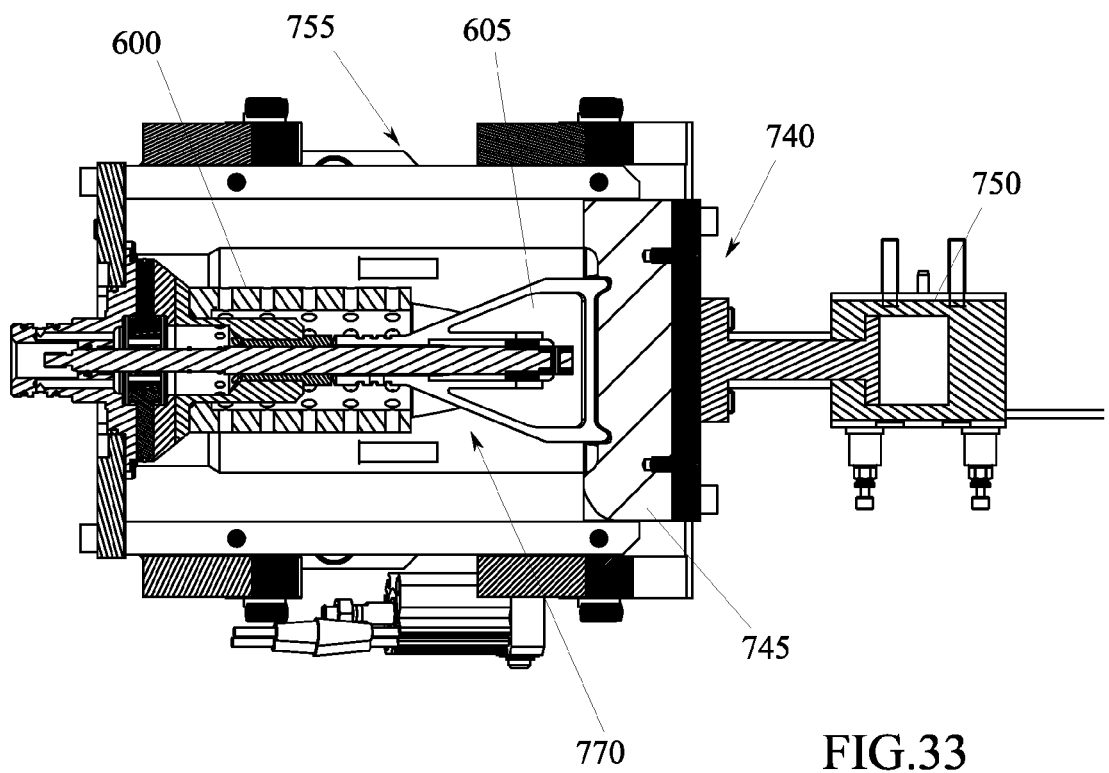
FIG. 33 is a section view of the profiling station of the third work apparatus of the machine.
Figure 34:
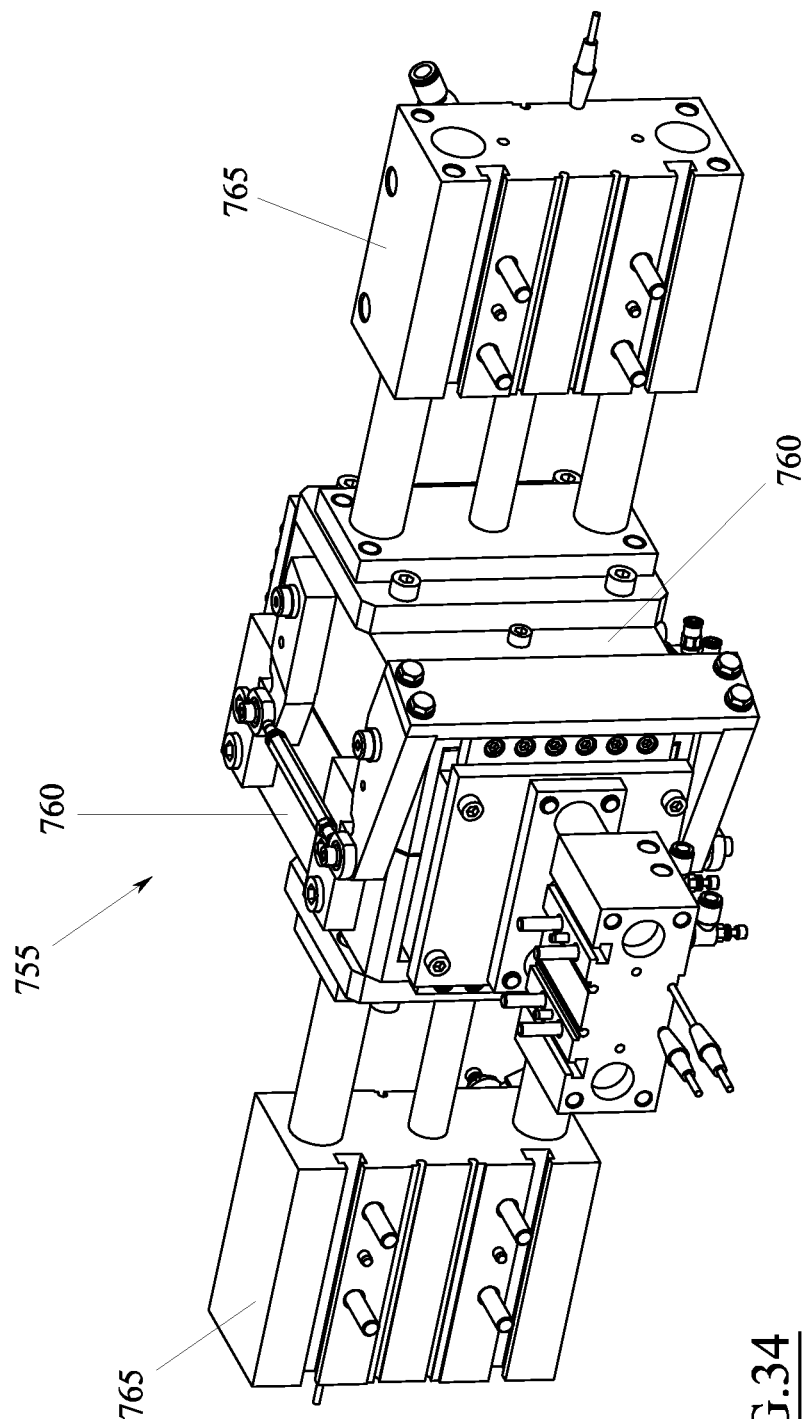
FIG. 34 is a perspective view of the means of FIG. 33.

After having folded the bottom the tubular blank 915 is brought by the relative support roller 600 into the profiling station 645. The profiling station 645 can comprise pressing means 740 able to deform the closed end of the tubular blank so as to realize a central recess. As illustrated in FIG. 33, the pressing means 740 can comprise a profiled punch 745 and actuating means 750, for example a pneumatic cylinder, able to move the profiled punch 745 in the direction of the axis of the support core 600. When the support roller 600 reaches the profiling station 645, the actuating means 750 press the punch 745 axially against the closed bottom of the tubular core 915 in opposition to the profiled plates 605 located internally. The punch 745 and the plates 605 are shaped so that the compression action creates, on the closed bottom of the tubular blank 915, a recess having a preferably square or rectangular shape which defines, at the same time, a projecting perimeter edge. This projecting edge on the bottom of the tubular blank 915 has the function of making the rest of the container, in use, more stable.

Figure 32:
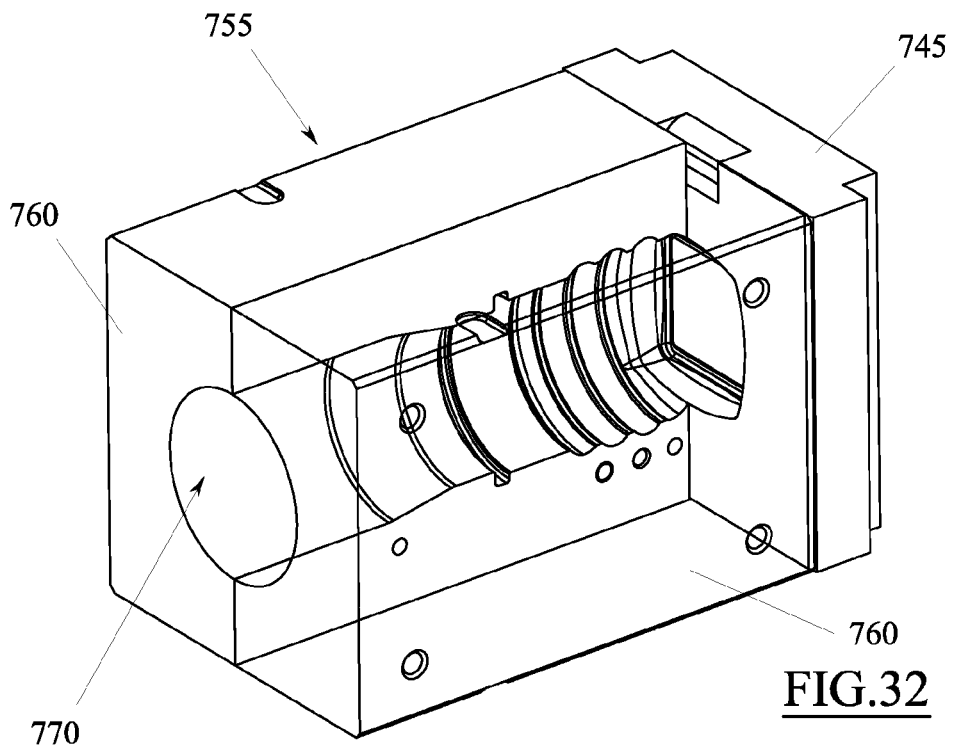
FIG. 32 is a perspective view (partly transparent) of means located at a profiling station of the third work apparatus of the machine.

The profiling station 645 can further (optionally) comprise profiling means 755 able to shape the lateral wall of the tubular blank 915 by means of blow moulding. The profiling means 755 can comprise two half-dies 760 positioned on opposite sides of the support core 600, and associated to respective pneumatic cylinders 765 able to near and distance them reciprocally to and from one another. When the support core 600 reaches the profiling station 645, the two half-dies 760 are initially open. After the advancing of the profiled punch 745, the pneumatic cylinders 765 near the two half-dies 760, which sealedly close on the tubular blank 915 at the reinforcing collar 910 and engage to the profiled punch 745. In this closed configuration, the two half-dies 760 define an internal profiled cavity 770 which closes the tubular blank 915 (see FIG. 32). At this point, appropriate pneumatic means (not illustrated) blow air at high pressure internally of the support core 600, which air, having crossed the perforated wall, inflates the tubular blank 915 and presses the lateral wall thereof against the internal walls of the profiled cavity 770, forcing it to take on the shape thereof. Using this method, the external profile of the tubular blank 915 is modified, generally in a less marked but more extended and pronounced way with respect to the impression method described in the foregoing. During the blowing step, the two half-dies 760 are kept clamped by a pneumatic blocking system which guarantees closure thereof. On conclusion of the deforming step, the half-dies 760 re-open and the rotor 660 rotates to bring the support core 600 into the release station 650.

Figure 35:
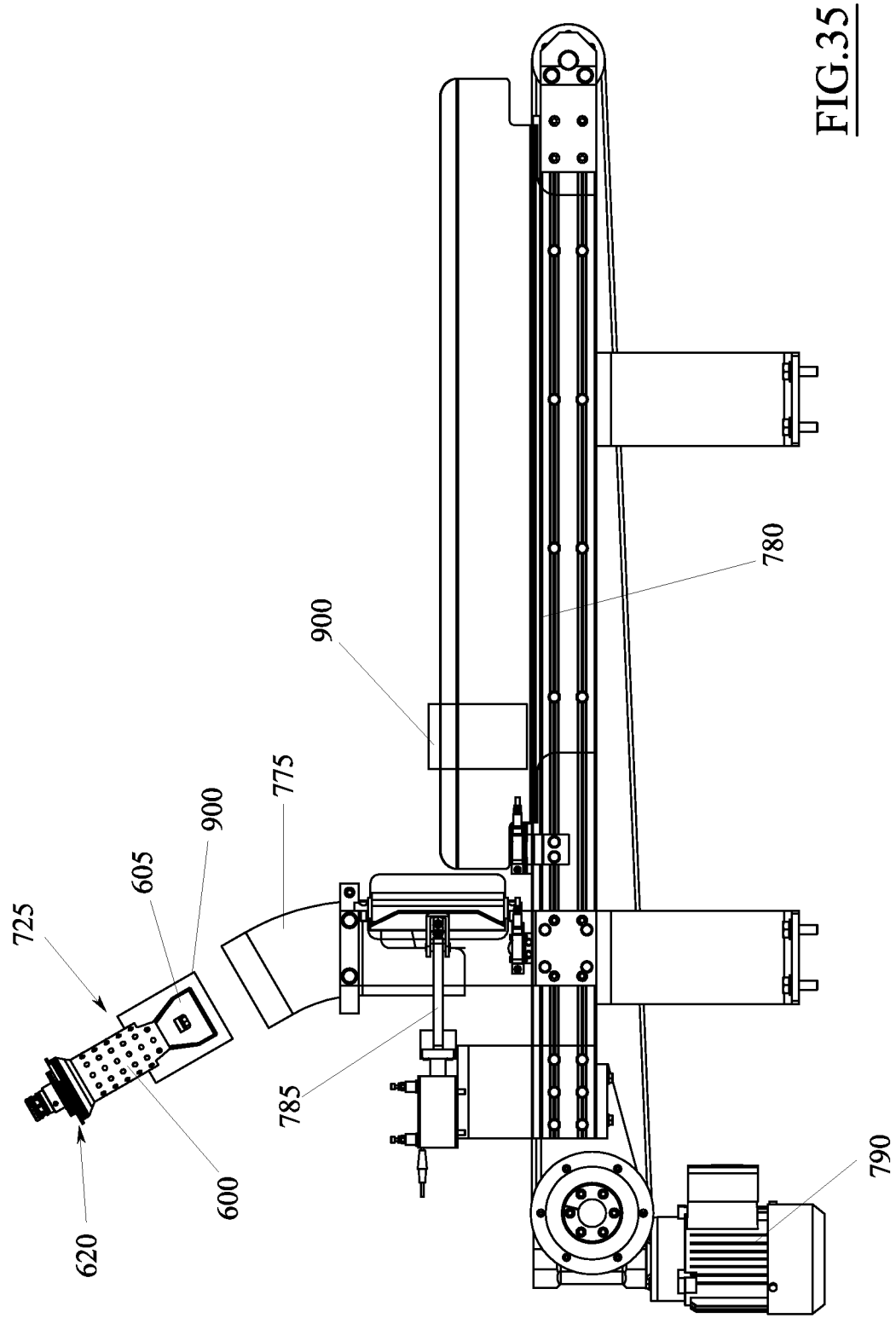
FIG. 35 is a lateral view showing means operating at a release station of the third work apparatus of the machine.

As illustrated in FIG. 35, in the release station 650, the expansion clamp 620 and the profiled plates 605 of the support core 600 are re-closed, so as to free the tubular blank 915 which has by now taken on the final shape of the container 900. At this point appropriate pneumatic means (not illustrated) blow a jet of air internally of the support core 600 which expels the container 900. At the release station 650, the third work apparatus 120 can thus comprise a funnel 775 which collects the container 900 expelled by the support core 600 and transports it on an unloading conveyor belt 780. The funnel 775 can be provided with a hatch door 785, pneumatically actuated, which regulates the outlet, preventing snagging and/or tiling of the container 900. The movement of the unloading conveyor belt is done with an electric gear reducer 790, for example an asynchronous gear reducer.

The above-described machine 100 is naturally provided with an electronic control and management system which regulates all the organs and operating steps, as described in the foregoing.

In the following a variant of the machine 100 will be described, which enables realising containers 900 which are without the reinforcing ring 910, which is replaced by an annular edging realised on the mouth of the container 900.

This annular edging is obtained in a single body with the container 900, simply by externally folding the edge of the tubular blank 915 opposite the edge that is closed so as to define the bottom of the container 900.

Figure 36:
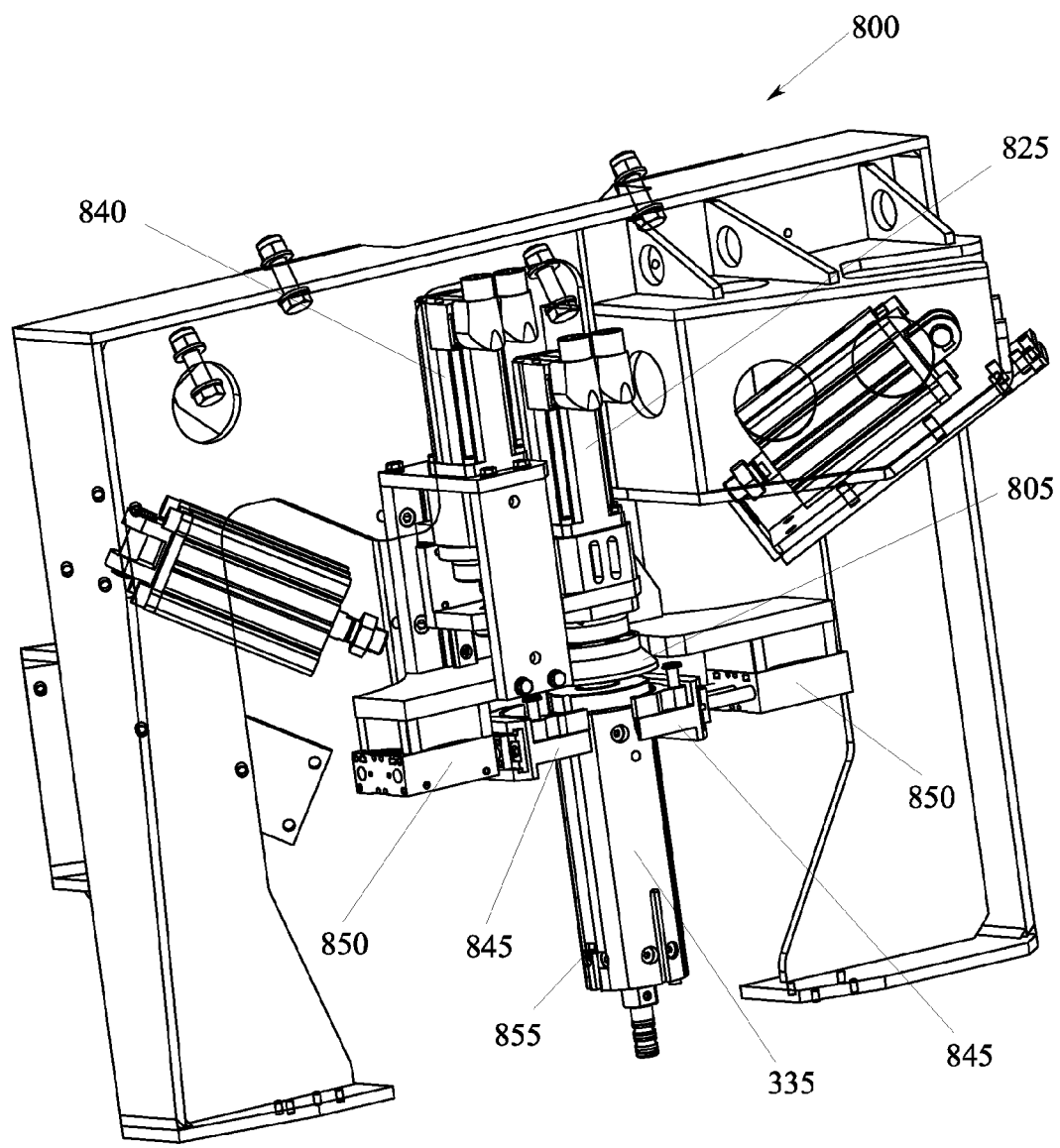
FIG. 36 illustrates an edging station applied to a machine according to an alternative embodiment of the invention.
Figure 37:
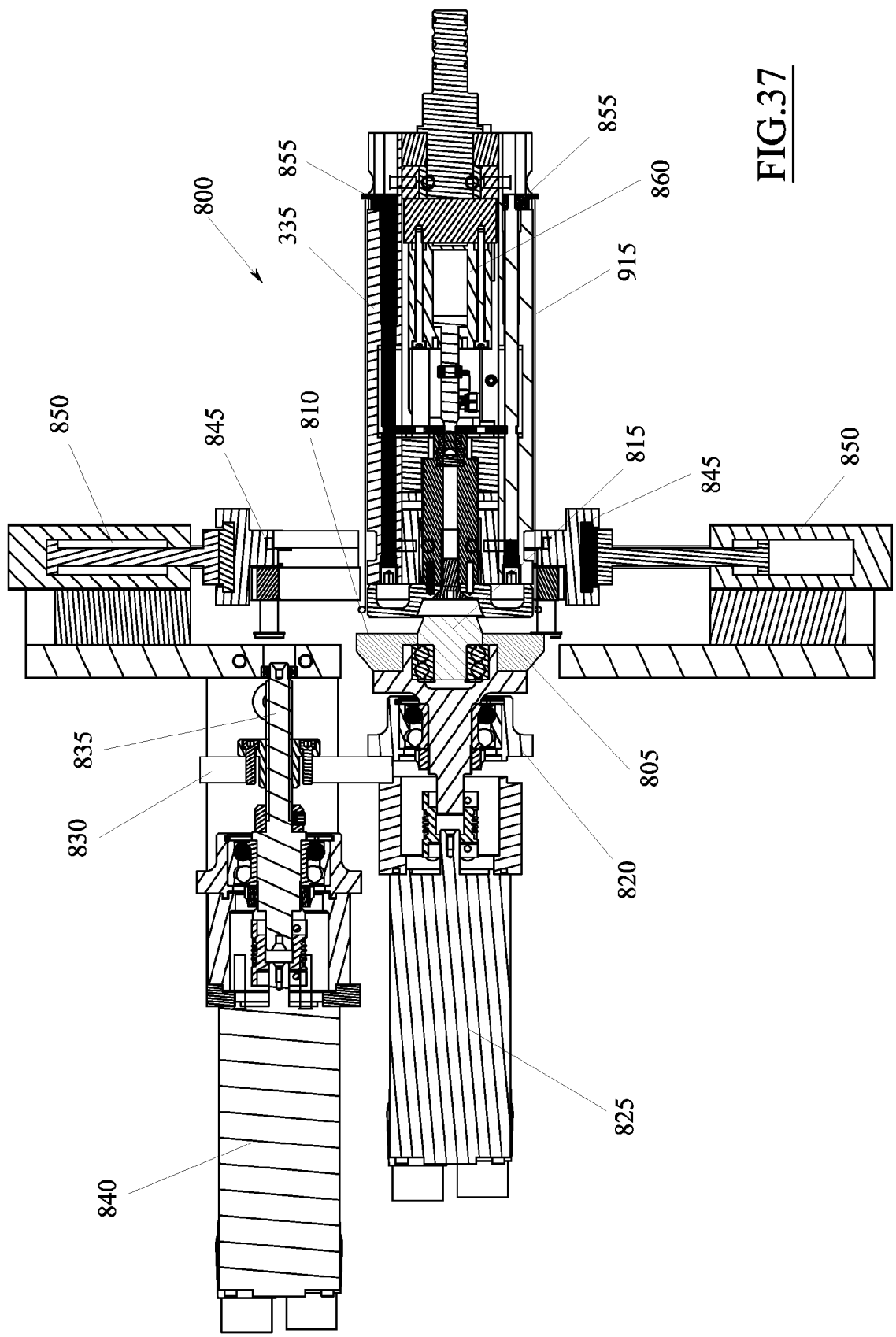
FIG. 37 is a section of the edging station of FIG. 36.

The machine 100 for obtaining this type of container 900 is entirely alike the one described above, with the only difference that no equipping station 360 is provided and the second fixing station 375 of the second operating apparatus 115 is replaced by an edging station 800, like the one illustrated in FIGS. 36 and 37.

Figure 38:
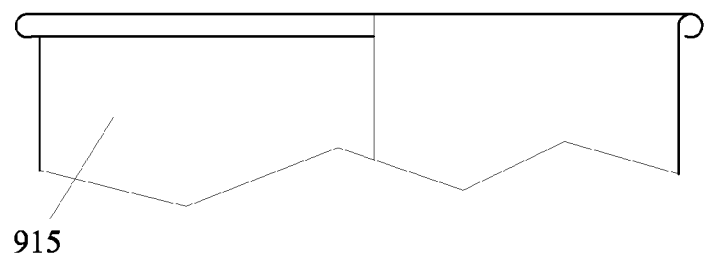
FIG. 38 is a partly-sectioned portion of an edge realised by the edging station of FIGS. 36 and 37.

The edging station 800 comprises an edging tool 805, which is conformed substantially as a cone arranged coaxially to the support core 335. The edging tool 805 is provided with a flat face 810 which is facing the free end of the support core 335. The flat face 810 can exhibit one or more annular grooves that house and guide the edge of the tubular blank 915. At the centre of the edging tool 805 a second centring cone 815 emerges, which is aligned with a corresponding housing cavity of the support core 335. The edging tool 805 and the centring cone 815 are rotatably coupled to a support structure 820, on which a brushless motor 825 is also mounted, able to set the edging tool 805 in rotation about its own axis. A nut screw 830 is also fixed to the support structure 820, which is screwed on a screw 835, preferably a trapeze screw. The screw 835 extends parallel to the axis of the edging tool 805 and is mounted in a fixed position on the machine 100, where it is set in rotation by a second brushless motor 840. The edging station 800 further comprises two clamps 845 which, actuated by respective pneumatic means 850, are able to selectively clamp the free end of the support core 335, blocking the tubular blank 915. The functioning of this edging station 800 includes the second motor 840 activating the screw 835, first causing the centring cone 815 to inserted on the support core 335 and thus ensure alignment. The tubular blank 915, which has been longitudinally welded in the preceding station, slides on the support core 335 towards the edging tool 805, pushed by two pusher elements 855 actuated by a pneumatic cylinder 860. When the edge of the tubular blank 915 projects from the free end of the support core 335 and contacts the edging tool 805, the two clamps 845 block the tubular blank 915. At this point, the motor 840 commands a further advancing of the edging tool 805 towards the support core 335, while the motor 825 places it simultaneously in rotation. The combined action of roto-advancement operated by the motors, also due to the grooves present on the flat face 810 of the edging tool 805, axially trace and fold towards the outside end of the tubular blank 915, realising an edging as illustrated in FIG. 38.

Naturally, a technical expert in the field might make numerous modifications of a technical-applicational nature to the machine 100, without its forsaking the scope of the invention as claimed in the following.

The invention claimed is:
1. A machine for realizing containers, comprising:
a first apparatus for impressing a shape in relief on a sheet of deformable material,
a second apparatus able to envelop the sheet on itself and reciprocally join lateral flaps thereof in order to form a tubular blank, and
a third apparatus able to close a bottom end of the tubular blank,
wherein the second apparatus comprises:
a plurality of support cores, each of which is provided with enveloping means for winding the sheet about itself, and
movement means for moving the plurality of support cores through a plurality of work stations, the plurality of work stations comprising at least a receiving station for receiving the sheet from the first apparatus, a fixing station provided with means configured to reciprocally join the lateral flaps of the sheet enveloped on each of the plurality of support cores, and a transfer station for transferring the sheet to the third apparatus,
wherein the movement means for the plurality of support cores of the second apparatus comprises a first rotor having a lateral wall, the plurality of support cores of the second apparatus being rigidly and directly fixed projectingly to the lateral wall of the first rotor so as to stay in contact with the lateral wall for a 360° rotation of the first rotor,
wherein the third apparatus comprises:
a plurality of support cores,
movement means for moving the plurality of support cores through a plurality of work stations, the plurality of work stations comprising at least a receiving station for receiving the tubular blank from the second apparatus, a sealing station comprising means for flattening a bottom end of the tubular blank bringing two portions of the tubular blank into reciprocal contact and joining the two portions to one another forming a rib, and a release station for releasing the tubular blank from each support core, and
folding means arranged between the sealing station and the release station, which are configured to cooperate with the movement of the support cores between the plurality of work stations, for folding opposite ends of the rib below and towards an inside of the tubular blank,
wherein the movement means for the plurality of support cores of the third apparatus comprises a second rotor having a lateral wall, the plurality of support cores of the third apparatus being rigidly and directly fixed projectingly to the lateral wall of the second rotor so as to stay in contact with the lateral wall for a 360° rotation of the second rotor.

2. The machine of claim 1, comprising:
a store defining a housing configured to contain a ream of sheets, and
transfer means for transferring a sheet at a time to the first apparatus.

3. The machine of claim 1, wherein the first apparatus comprises transport means configured to advance the sheet through a plurality of work stations, the plurality of work stations comprising at least a sheet-receiving station, a profiling station provided with impressing means configured to impress the shape in relief on the sheet, and a transfer station for transferring the sheet from the first apparatus to the second apparatus.

4. The machine of claim 3, wherein the transport means comprises a belt conveyor, which is retractable at the transfer station.

5. The machine of claim 3, wherein the impressing means comprises a press provided with actuator means able to press two half-dies one on another, at least one of the half-dies bearing in relief the shape to be pressed on the sheet.

6. The machine of claim 1, wherein the enveloping means of each support core of the second apparatus comprises:
a retaining element configured to move in a transversal direction with respect to an axis of the support core, so as to clamp a sheet against a lateral surface of the support core, and
a pair of enveloping elements positioned on opposite sides of the retaining element and configured to rotate about the axis of the support core in opposite directions, for winding the sheet about the support core.

7. The machine of claim 1, wherein the work stations of the second apparatus further comprise an equipping station located between the transfer station and the receiving station, wherein the equipping station is provided with means for inserting a reinforcing ring at an end of the support core so that the sheet is wound about the support core and the reinforcing ring, wherein the fixing station is located between the receiving station and the transfer station, and wherein the fixing station is provided with means for joining the reinforcing ring to a portion of the tubular blank wound about the support core which envelops the reinforcing ring.

8. The machine of claim 1, wherein the folding means of the third apparatus comprises:
- a roller configured to axially press a closed bottom end of the tubular blank, and
- a pair of guides disposed between the roller and the release station and able to fold the opposite ends of the rib.

9. The machine of claim 1, wherein the work stations of the third apparatus further comprise a profiling station positioned between the folding means and the release station, the profiling station comprising pressing means configured to deform the bottom end of the tubular blank to realize a recess.

10. The machine of claim 9, wherein the pressing means comprises a profiled punch and actuating means able to press the punch axially against the bottom end of the tubular blank.

11. The machine of claim 9, wherein the profiling station further comprises profiling means for shaping a lateral wall of the tubular blank by blow molding.

12. The machine of claim 11, wherein the profiling means comprises two half-dies which can be reciprocally neared so as to define a profiled cavity which encloses the tubular blank, and a pneumatic blower for blowing air into the support core, the support core having a perforated wall so that the air blown into the support core inflates the tubular blank and presses the lateral wall thereof against internal walls of the profiled cavity.

13. The machine of claim 1, further comprising transfer means for removing the tubular blank from the support core located in the transfer station of the second apparatus and inserting the removed tubular blank to the support core located in the receiving station of the third apparatus.

14. The machine of claim 1, wherein each support core of the second apparatus comprises a cylindrical body, wherein each support core of the third apparatus comprises a cylindrical body, and wherein the cylindrical body of the support core in the receiving station of the third apparatus is aligned and coaxial with the cylindrical body of the support core in the transfer station of the second apparatus.

15. The machine of claim 1, wherein the first rotor is actuated by a first electric gear reducer and the second rotor is actuated by a second electric gear reducer.

* * * * *